(12) United States Patent
Stefik et al.

(10) Patent No.: US 12,555,028 B2
(45) Date of Patent: Feb. 17, 2026

(54) SYSTEM AND METHOD FOR COORDINATED AGENT LEARNING AND EXPLANATION USING HIERARCHICAL FACTORS

(71) Applicant: Genesee Valley Innovations, LLC, Santa Clara, CA (US)

(72) Inventors: Mark J. Stefik, Portola Valley, CA (US); Gregory Michael Youngblood, Minden, NV (US); Robert T. Krivacic, San Jose, CA (US); Jacob Le, Palo Alto, CA (US); Lester D. Nelson, Santa Clara, CA (US); Robert R. Price, Palo Alto, CA (US)

(73) Assignee: Genesee Valley Innovations, LLC, Santa Clara, CA (US)

( * ) Notice: Subject to any disclaimer, the term of this patent is extended or adjusted under 35 U.S.C. 154(b) by 1245 days.

(21) Appl. No.: 17/213,004

(22) Filed: Mar. 25, 2021

(65) Prior Publication Data

US 2021/0303932 A1 Sep. 30, 2021

Related U.S. Application Data

(60) Provisional application No. 63/002,252, filed on Mar. 30, 2020.

(51) Int. Cl.
*G06N 20/00* (2019.01)
*G06F 18/21* (2023.01)
(Continued)

(52) U.S. Cl.
CPC ........... *G06N 20/00* (2019.01); *G06F 18/217* (2023.01); *G06N 5/022* (2013.01); *G06N 5/025* (2013.01); *G06N 5/045* (2013.01)

(58) Field of Classification Search
CPC ........ G06N 20/00; G06N 5/022; G06N 5/025; G06N 5/045; G06F 18/217
See application file for complete search history.

(56) References Cited

U.S. PATENT DOCUMENTS

| 2012/0136567 A1* | 5/2012 | Wang | G01C 21/3461 701/414 |
|---|---|---|---|
| 2017/0140468 A1* | 5/2017 | Peak | G16H 10/40 |
| 2020/0409375 A1* | 12/2020 | Bowe | G06F 16/29 |

OTHER PUBLICATIONS

Raj Korpan et al., "WHY: Natural Explanations from a Robot Navigator", Sep. 27, 2017, arXiv:1709.09741v1, referenced as WHY. (Year: 2017).*

(Continued)

*Primary Examiner* — April Y Blair
(74) *Attorney, Agent, or Firm* — Krista A. Wittman

(57) ABSTRACT

A system and method for selection and explanation of solutions is provided. A hierarchy of aggregation factors is maintained for evaluating at least a partial solution. Competing solutions are generated and each solution includes at least a partial solution. Scores are calculated for each of the aggregation factors for each competing solution. A total evaluation score is calculated for each competing solution based on the scores for at least one of the aggregation factors. The competing solution with the best evaluation score is selected and a gist is generated. The gist is a narrative comparing the selected solution with the non-selected solutions based on the at least one aggregation factor. The gist is provided to a user as a rationale for selection of the solution.

20 Claims, 15 Drawing Sheets

(51) Int. Cl.
*G06N 5/022* (2023.01)
*G06N 5/025* (2023.01)
*G06N 5/045* (2023.01)

(56) References Cited

OTHER PUBLICATIONS

Raj Korpan et al., "WHY: Natural Explanations from a Robot Navigator," arxiv.org, Cornell University Library, 201 Olin Library Cornell University Ithaca, NY 14853, Sep. 27, 2017, XP080824215.

Dieterich, Thomas. Hierarchical reinforcement learning with the MAXQ value function decomposition, Journal of Artificial Intelligence Research, 13, pp. 227-303, 2000.

Erwig, Martin, Fern, Alan, Murali, Magesh, Koul, Anurag. Explaining deep adaptive programs via reward decomposition. IJCAI, 2018.

Juozapaitis, Zoe, Koul, Anurag, Fern, Alan, Erwig, Martin, Doshi-Velez, Finale. Explainable Reinforcement Learning via Reward Decomposition, IJCAI 2019 Workshop on Explainable Artificial Intelligence (XAI), Macau, China. Aug. 11, 2019.

Khan, Omar Zia, Poupart, Pascal, Black, James P. Minimal sufficient explanations for factored Markov decision processes. ICAPS, 2009.

Miller, George A., The Magical Number Seven, Plus or Minus Two: Some Limits on our Capacity for Processing Information. Psychological Review, 63, pp. 81-97, 1956.

Newell, Allen, Simon, Herbert, A. Human Problem Solving: The state of the theory in 1970. American Psychologist 26(2), pp. 145-159, 1970.

Ohlsson, Stellon. The problems with problem solving: Reflections on the rise, current status, and possible future of a cognitive research paradigm. The Journal of Problem Solving, 5(2), 2012.

Sacerdoti, Earl D., Planning in a Hierarchy of Abstraction Spaces, Artificial Intelligence, pp. 15-135, 1974.

Stefik, Mark. Planning with Constraints. Artificial Intelligence, pp. 111-139, Sep. 1980.

Stefik, Mark. Planning and Meta-Planning. Artificial Intelligence, pp. 141-169, Sep. 1980.

\* cited by examiner

SYSTEM AND METHOD FOR COORDINATED AGENT LEARNING AND EXPLANATION USING HIERARCHICAL FACTORS

CROSS-REFERENCE TO RELATED APPLICATION

This non-provisional patent application claims priority under 35 U.S.C. § 119 (e) to U.S. Provisional Patent application, Ser. No. 63/002,252, filed Mar. 30, 2020, the disclosure of which is incorporated by reference.

FIELD

This application relates in general to artificial intelligence systems, and in particular to a system and method for coordinated agent learning and explanation using hierarchical factors.

BACKGROUND

Advances in machine learning and artificial intelligence (AI) systems have led to computational agents that can carry out useful activities and demonstrate substantial capabilities even on complex tasks. However, an obstacle to the widespread use of such systems especially when they have machine-learned behavior is that they may not be well-understood by users. When an AI agent is opaque, erratic, inconsistent, or unpredictable, that agent is inappropriate for critical applications. For this reason, transparency, predictability and explainability are now recognized as essential characteristics for these systems.

Like people, computational agents make observations and choose actions in carrying out their activities. Understanding the logic, choices, and behavior of self-learning systems in terms of machine-generated explanations for when these systems choose among alternative options and courses of action can be useful in determining whether a particular system is trustworthy or appropriate for a particular task. Yet, when many interacting factors are involved, understanding what decisions and trade-offs the computational agents make in specific situations and assessing their competencies is difficult.

Reinforcement learning (RL) is a learning technique whereby an AI learns a policy about what to do by interacting with its environment. In a typical arrangement, an RL considers the internal state of the agent and the state of the situation in the environment. They try to build a policy that tells them the best thing to do in any state. Reinforcement learning agents learn to associate patterns of situations in the environment and their own internal state that tend to lead to particular actions.

There are many variations, but internal state generally corresponds to physical and cognitive conditions analogous to hunger or pain, or goals and intentions. Agents sense their environment and take actions to affect the state or to achieve goals. The learning problem for agents is to determine what actions to take to achieve the agent's goals in different situations.

Reinforcement learning models an agent's interaction with the environment in terms of rewards or penalties. An agent learns a policy that represents what actions are associated with optimal rewards in different situations. Policies can be complex for an agent to learn and for people to understand. For instance, an extended sequence of actions may be needed to achieve a goal, including approaching a goal in a round-about way to avoid particular difficulties.

An agent's learning process requires accounting for its previous experiences. An agent must explore different action choices and compare the results of different options. In its learning mode, an agent creates a representation called a policy that records the agent's estimate about what to do based on its experiences so far. A guiding principle in creating a policy is to maximize rewards, or similarly, to minimize penalties. When the agent's world is complex, it is not practical for an agent to remember every situation that it encountered. Furthermore, agents are expected to perform in new situations that differ from their previous experience, which requires agents to generalize from their experiences. An agent may need to modify its policy when its learned actions yield unexpected penalties or when unexpectedly low rewards arise in situations that seem to be the same or similar to previous experiences.

Until recently, theories and methods of reinforcement learning were designed only to determine what agents should learn to optimize their performance and little attention was given to enabling agents also to explain their actions. For example, why did an agent decide to take a particular action? What alternative actions did the agent consider? Why was one particular action preferred over another one?

An approach for explaining the actions of a reinforcement learner was proposed by Martin Erwig, Alan Fern, Magesh Murali, and Anurag Koul in "Explaining Deep Adaptive Programs via Reward Decomposition," IJCAI, 2018. They describe an Adaption Based Programming (ABP) approach where the policy for an agent combines a computer program written by a human programmer with an interpreter for embedded self-learned choice points. Reinforcement learning is used to optimize the agent's choice of actions at the choice points. In the ABP approach, the reward for the reinforcement learner is decomposed into additive rewards of different types and explanations of choices using a minimal subset of rewards that is sufficient for distinguishing the advantages of one action over another are constructed. The reward types are chosen to be understandable to users as part of the shared or common ground language used by the AI with people.

Beyond common ground, another key issue bearing on the understandability and usefulness of explanations is complexity. In complex domains, the number of factors needed to describe the conditions and considerations can be very large. Even when the number of factors for a set of aggregation factors is only ten or twenty, it can be difficult for people to understand or predict the agent's priorities or the trade-offs that it will make in different situations.

Erwig, Fern, Murali, and Koul recommend creating a minimum sufficient explanation (MSE) by selecting main factors that are active in a given situation. Unfortunately, the process of the selecting the main factors can still create explanations for human users with factors from a large and confusing set of combinations. Their approach misses an opportunity for creating more effective explanations using aggregations and abstractions that enable representing trade-off patterns in more abstract, general, and memorable ways.

Accordingly, a clear, concise, and easy to understand explanation of decisions by artificial intelligence systems is needed. Preferably, hierarchically organized aggregation factors for a domain are utilized to evaluate full and partial solutions, to guide search-based problem solving methods and machine learning methods that create policies for solving problems, and to assess and explain the system's reasoning.

SUMMARY

An embodiment provides a system and method for guiding an AI system based on a Hierarchical Multi-Factor (HMF) model. A HMF model provides a set of separate factors that represent different considerations used in assessing solutions or partial solutions. An HMF model organizes aggregation factors hierarchically, that is, in trees where parent factors in a tree can have subfactors, that is, child factors. In HMF models, numerical values of parent factors are the sums of the values of their subfactors.

For a simplified example, a design for a car might have factors for the car's weight, its cost of manufacture, an estimate of annual maintenance costs, an estimate of fuel consumption, and others. When a consumer is choosing between two cars, they may compare them according to a subset of the different factors. For example, from an autonomous craft domain used below, mission flight plans might be evaluated according to factors such as the flying time to deliver a package, the time to egress from a drop point to the end point, risks to craft safety, risks to package safety, accessibility of the delivered package at the landing point, and so on. In short, HMF models are intended to structure decision making where there are multiple considerations in picking a solution such as a good design or a good flight plan.

Separate from the factors are the state changing operators used in problem solving. For example, in the scenario world of flight plans, the operations correspond to actions that can be taken by an automated pilot in a flight plan such turning 45 degrees to the right, going up in altitude, and so on. A sequence of such operations constitutes a flight plan. The flight plans or partial flight plans can be evaluated according to the aggregation factors. In the car design example, the operations might correspond to manufacturing operations for building parts and assembling a car. The HMF models are used in comparing outcomes-one kind of car versus another.

A system that can design a car or plan a flight uses knowledge to decide what to do. That knowledge can be incorporated into the system by programming. Increasingly, the knowledge is acquired through a machine learning process.

In further embodiment, the HMF factors can also be used in guiding machine learning and in generating explanations for users of the system. The factors can be given names that are intended to convey clear common ground meanings to users.

Natural language gists, or explanations, are generated to summarize in a brief narrative the rationale for decisions made by AI agents in the system. The rationale is expressed in terms of the factors. The gists may identify a set of salient factors involved in a decision which makes a trade-off in a design or plan. For example, the AI pilot of one autonomous craft might take a short but risky path in order to arrive a destination quickly. Another AI pilot might choose a drop point which takes risks for the craft on an ingress route but which enables reaching a landing spot where the package can land safely. Trade-off patterns show how an agent trades the lower benefits of an alternative choice for the greater benefits of a more optimal choice. In this approach, the abstraction and aggregation hierarchies enable principled use of concise abstractions or aggregations of factors. Besides calling out the dominant factors, alternative factors that are employed in competing choices are also utilized. The chosen factors and the alternative factors can be used to describe trade-offs in specific situations.

Users needing to understand an AI's decisions need to understand the world state in which decisions are made. For example, when an HMF model assesses that part of a flight plan is dangerous, users may not be practiced in interpreting a flight plan. They may not notice exactly where a craft changes altitude or where the craft might be subject to collisions caused by cross-winds in a narrow mountain pass. To assist in creating common ground about situations in the world, visual explanations can be employed. For example, visual explanations of risky segments of a flight plan can highlight where the craft close to a tower or a mountain and thereby risks craft safety. They can show which obstacles are within a drop zone for a package. In this way, visual explanations highlight the objects in situations in the world that are involved in creating risks. These visualizations in a planning or design context can help users to recognize what options are considered in different situations, and to better understand how an agent prioritizes preferences and values in evaluating trade-offs for competing choices.

Further, factors are partitioned by subgoals and subproblems. In complex domains, the overall solution of a problem can be meaningfully partitioned into independent and nearly independent (or loosely-coupled) subproblems. In complex domains, particular goals and aggregation factors are typically different for different kinds of subproblems. This divide-and-conquer mechanism can provide understandable explanations on tasks of greater complexity and scale.

Hybrid architectures can involve multiple stages of learning, multiple representations, and multiple ways of combining solutions to subproblems. In the current state of the art, hybrid AI system architectures provide flexibility for incorporating machine learning systems as elements in an overall architecture, which combines learning models and other elements for incorporating prior knowledge including knowledge about the partitioning of tasks into subtasks.

A further embodiment provides a system and method for selection and explanation of solutions. A hierarchy of aggregation factors is maintained for evaluating at least a partial solution. Competing solutions are generated and each solution includes at least a partial solution. Scores are calculated for each of the aggregation factors for each competing solution. An evaluation score is calculated for at least one of the aggregation factors for each competing solution. The competing solution with the best evaluation score is selected and a gist is generated. The gist is a narrative comparing the selected solution with the non-selected solutions based on the at least one aggregation factor. The gist is provided to a user as a rationale for selection of the solution.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Figure 1:
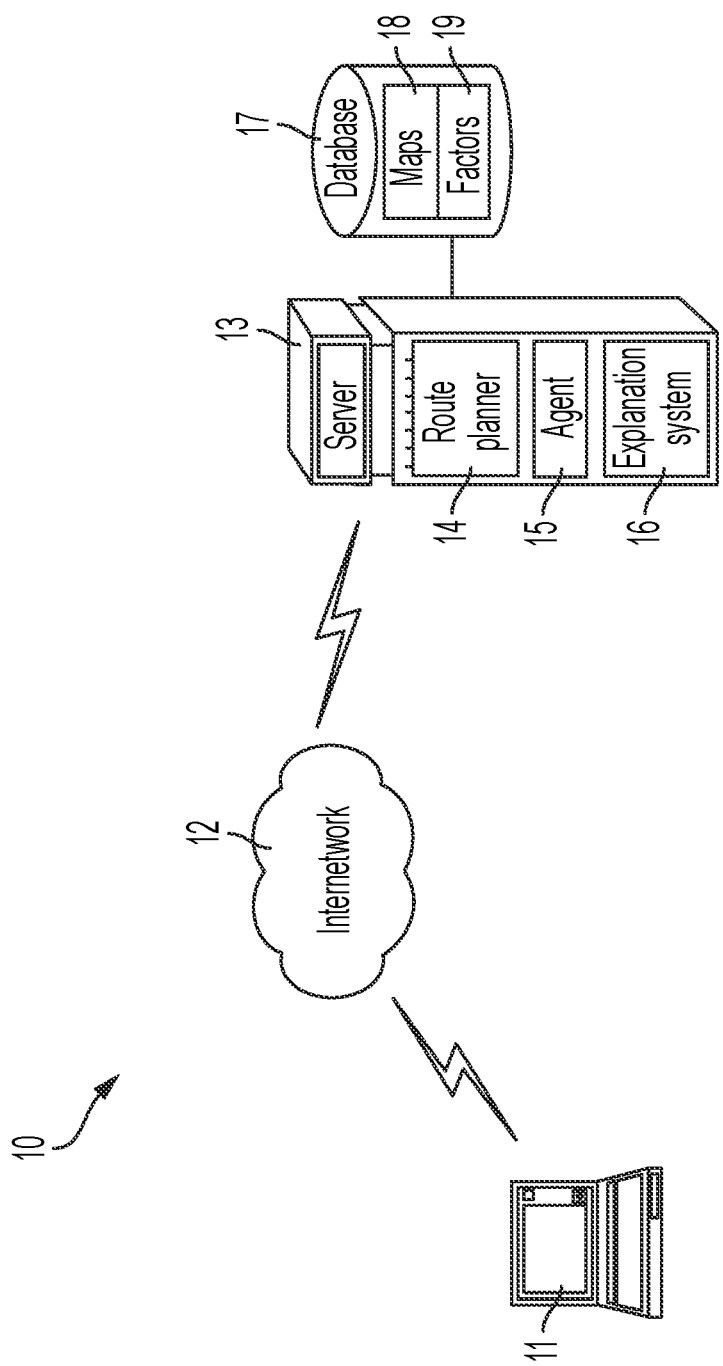
FIG. 1 is a block diagram showing a system for coordinated agent learning and explanation, in accordance with one embodiment.

With advances in technology, artificial intelligence systems act like humans to perform tasks and can include uses as smart assistants, chat bots for use in medical, business, and travel industries. Artificial intelligence systems can also be used for disease mapping and healthcare management. Specifically, artificial intelligence systems are able to process large amounts of data, which is used to guide decision making with respect to the tasks performed.

However, although the use of artificial intelligence systems has increased, an obstacle to widespread use remains. Users often do not understand the machine-learned behavior of the systems. Accordingly, transparency, predictability, and explainability will help increase confidence in the systems and enable the greater use of such systems. The explanations must be understandable to a user and not convoluted by many difficult and hard to understand factors, which are used by the systems in making a decision.

Explanation systems are intended to help users to understand XAI (explainable AI) systems. For example, users may need to decide whether an agent in an AI application is competent for a particular kind of mission. They may want to understand how the agent makes decisions so that they can determine when they can trust the agent. A user may need to determine the situations for which an agent lacks adequate competence and needs more experience. These usage contexts have requirements in common. In each context, the agent needs to be able to answer questions like: What option did the agent choose? Why did the agent prefer this option? What alternative options did the agent consider? Why did it prefer this option over that one?

A mechanism to answer such questions by generating alternatives, by evaluating the alternatives in terms of hierarchical aggregation factors, and by explaining agent preferences in terms of trade-offs will provide the transparency required to increase the trust of users in AI agents.

Terminology in Hierarchical Multi-Factor (HMF) Problems and Models

Hierarchical multi-factor problems (HMF) are problems whose solution can be described in terms of the values of multiple separate factors that describe an outcome. In commonly used terminology from planning, design, simulation, and modeling, the factors are called state variables. A state in HMF problems is an intermediate outcome that results when state-change rules are applied. It is convenient to distinguish between hidden and exposed state variables where hidden means that the state variable is not shown to users and exposed means that the variable is shown to users. A factor is an exposed state variable.

Some subclasses of factors are useful for understanding explanations. In a simulation, state variables get values when a simulation is run. For example, if an object is moved in the simulation world or a change is made to a design or plan, corresponding state variables get new values. A derived factor is the value of some function of other state variables. An aggregated factor is a factor whose value is the sum of other factors. In HMF, aggregated factors are organized in hierarchies so that the value of a parent node (e.g. representing risk or time) is the sum of the values of a subtree of child state variables.

It is convenient when an HMF model is used for planning or design problems to recognize that there can be trade-offs in choosing a plan or design. For example, in a design there may be trade-offs between cost and durability. In a plan there may be trade-offs between risk and time. The differences between competing plans or designs are represented in terms of differences in the values of factors representing cost, durability, risk, time, or other quantities that are relevant to the domain. These trade-offs are important for human decisions about what solutions are better in a design or planning problem and it is useful to express the rationale for preferring one plan or design over another in terms of trade-offs. It is convenient to refer to the factors involved in such explanations and choices as aggregation factors.

System for Agent Learning, Problem Solving, and Explanation

A hierarchy of factors can be used to guide learning by the artificial intelligence systems and generate explanations that are easy for human users to understand. FIG. 1 is a block diagram showing a system 10 for coordinated agent learning and explanation, in accordance with one embodiment. A user, via a computer 11, such as a laptop, desktop, or mobile device, can send a request for information or for a task to be performed to a server 13 via an internetwork 13, such as the Internet. The server 13 is interconnected to database 17 that stores maps 18 and aggregation factors 19. The aggregation factors can be organized hierarchically, as further described in detail below with respect to FIG. 8. The server includes an AI agent 15 that generates competing plans for a task or activity based on the factors 19 and selects one of the plans, and an explanation system 16 that generates an explanation as why one plan was selected as a better plan over the other plans. In one example, the maps 18 can be utilized to show competing routes to one or more locations, as further described below with reference to FIG. 3. The competing plans can be provided to the user in response to the request, with an explanation as to the better plan and the aggregation factors used to determine the better plan, as provided by the explanation system 16.

Method for Agent Learning and Explanation

The explanations generated by the explanation system can be provided in several forms that are appropriate for communicating with users, including gists that provide a short narrative about why one candidate solution has advantages over another. For example, the narrative can summarize a preferred choice in terms of a trade-off. Explanations can also take the form of factor tables that compare corresponding values of factors for different candidate solutions.

It is useful to complement narrative and table forms of explanation with visual explanations. Herbert Clark used the term common ground to describe a process observed when people collaborate such as in a discussion of a design or plan. In a design or plan, they may make reference to different objects or areas in a design or plan. For example, "here is where the 3D printing of the part is subject to excess stress" or "here is where the craft gets too close to an obstacle on egress". In human conversation, it is convenient to be able to point to parts of a design, plan, or scene to clarify the reference to "here." In AI explanations, there is a similar need to create common ground and to clarify references in explanations. For example, a factor table or term in a gist can provide a place for a user to "click" or touch to get a visual explanation. In a design or plan, the visual explanation draws the user's attention to a part of the design or plan. This can be done by various means such as highlighting, change of color, zooming, and other changes to a display of a design or plan to communicate to the user the part or area that is being referred to, as described in further detail below with reference to FIGS. 6, 7, and 10-14.

Figure 2:
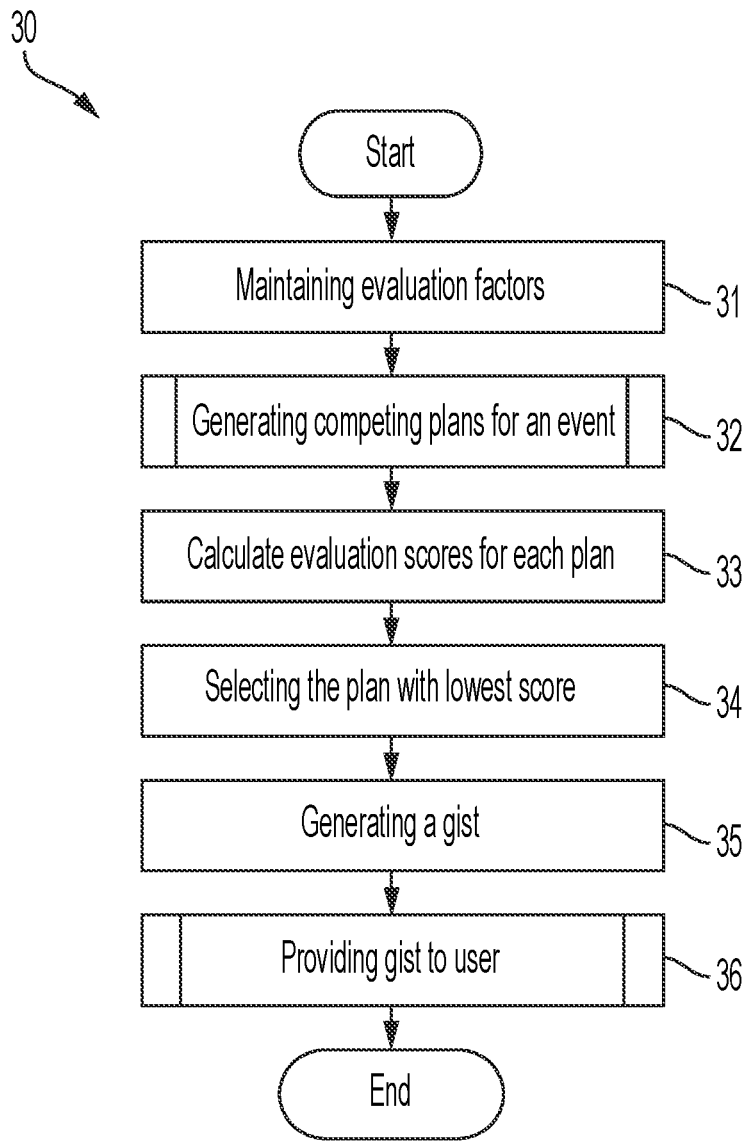
FIG. 2 is a process diagram showing a method for coordinated agent learning and explanation, in accordance with one embodiment.

To generate the explanation, competing plans are first identified and examined. FIG. 2 is a process diagram showing a method 30 for coordinated agent learning and explanation, in accordance with one embodiment. A set of evaluation or aggregation factors are maintained (step 31) for use by the agent in generating and explaining plans for a task or activity. A request for a particular task or activity is received (step 32) and competing plans are generated (step 33) for the task or activity. Evaluation scores are calculated (step 34) for each plan based on a set of hierarchical factors and the plan with the best evaluation score is selected (step 35) for performing the task or activity. A gist is generated (step 36) as an explanation of reasons the plan was selected. The plans and gist are provided (step 37) to the user.

Hybrid AI System Architecture for Learning and Explaining

Figure 3:
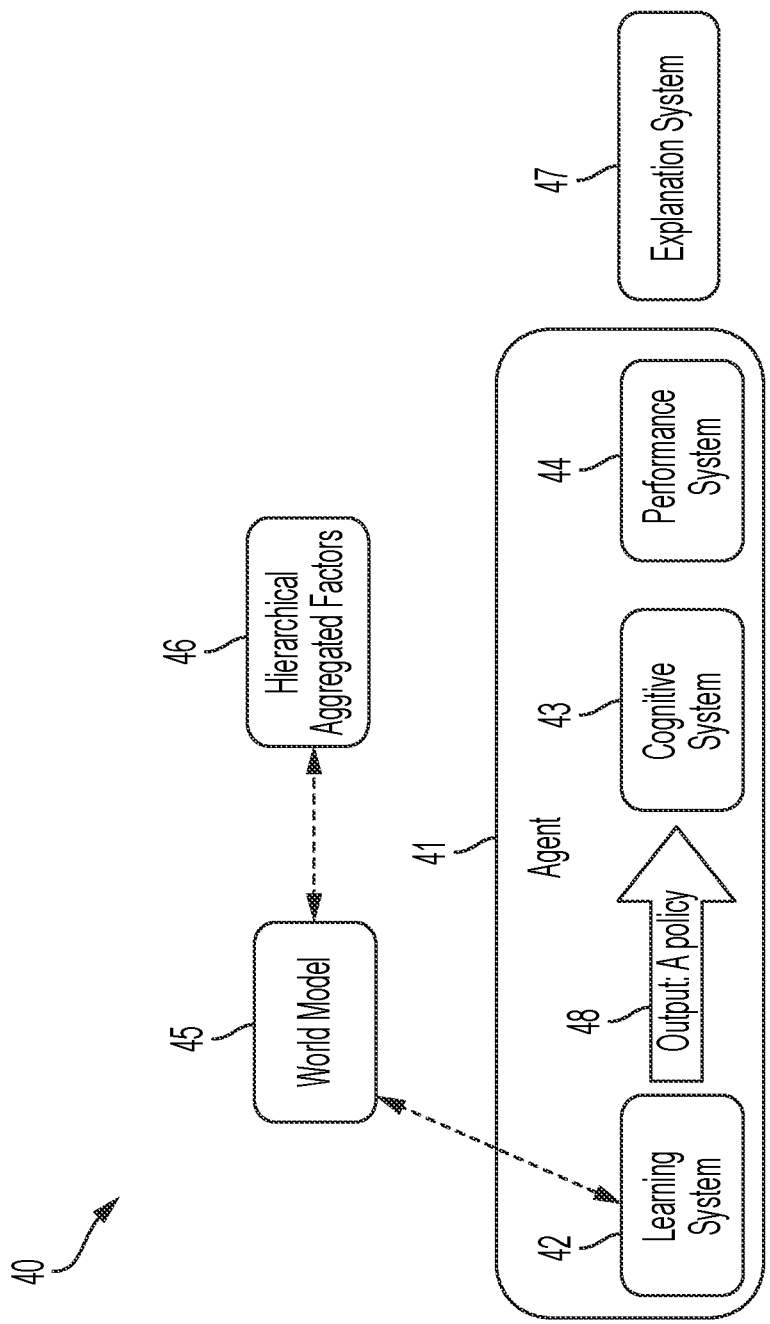
FIG. 3 is a block diagram showing, by way of example, an AI agent's hybrid AI architecture.

To provide a clear and concise explanation to the user, a hybrid AI architecture that combines AI system components for learning, problem-solving, search, domain or world modeling, and cognitive modeling, can be used. FIG. 3 is a block diagram showing, by way of example, an AI agent's hybrid AI architecture. The agent 41 includes a world model 45, a learning system 42, a cognitive system 43, and a performance system 44. The world model 45 includes state variables for representing its state and domain rules for changing the values of the state variables as changes are made to a design or plan. During learning, the agent 41 uses reinforcement learning to develop a policy that specifies what to do in different situations. In reinforcement learning, the learning system 42 utilizes data, such as world models 45 and hierarchical aggregation factors 46 to make decisions and obtains feedback reflecting rewards or penalties that are expected from taking an action based on the decision.

This feedback can reflect an assessment of the value of future actions. The calculation of expected rewards in a simulation world model corresponds to the values assigned by evaluation functions for the hierarchical aggregation factors in the simulated environment. Based on this feedback, the learning system 42 creates a policy 48 intended to maximize value or minimize penalty. The policy 48 of the learning system 42 identifies those actions that are associated with optimal rewards in different situations and is used by the agent's performance system to decide what to do in various situations. In one embodiment, the learning system 42 is sufficiently trained to produce optimal or nearly-optimal options.

A user's need for explanations also arises in AI systems that do not involve machine learning. Explanations can be generated for non-learning AI explanations in the same way, using the HMF model in the world model and generating the gists, factor tables, and visual explanations in the same way. For example, in a symbolic AI system that uses search techniques (See Stefik textbook-Introduction to Knowledge Systems) world model and simulator provide feedback for evaluating complete and partial solutions in exactly the same way.

Figure 4:
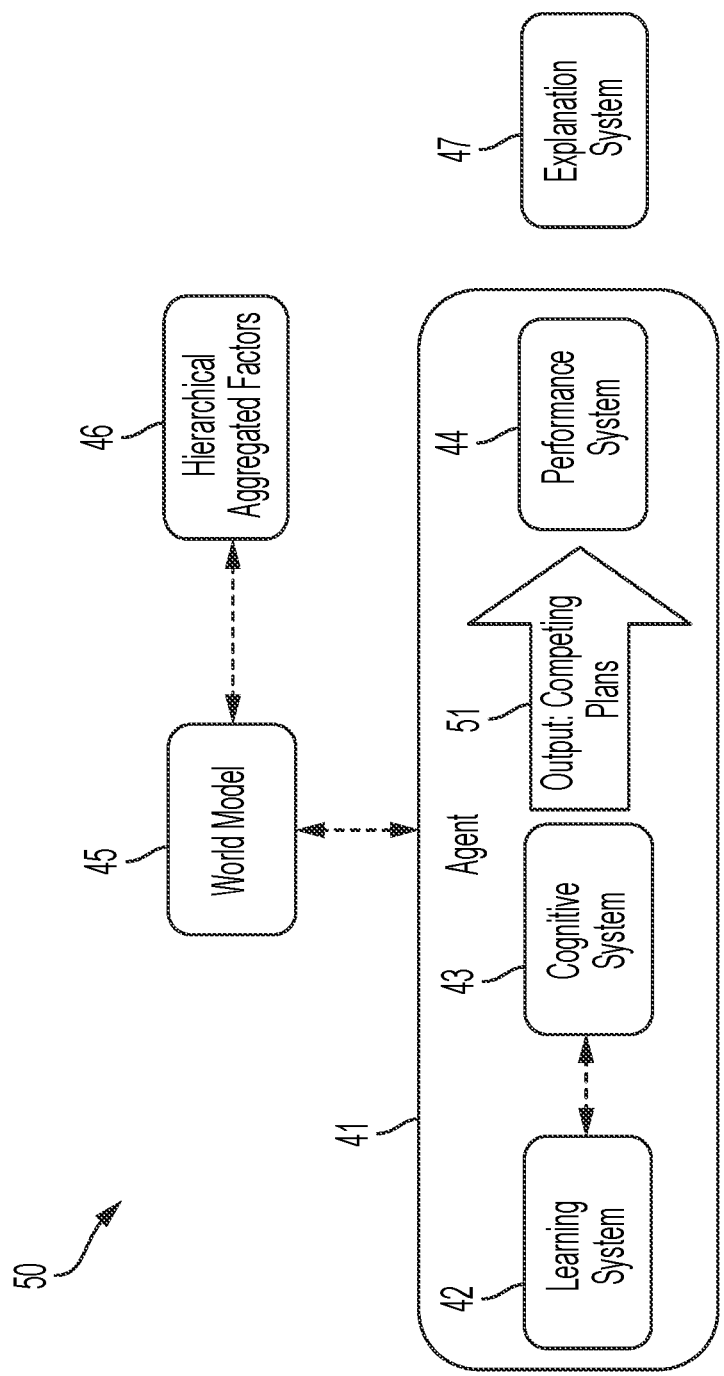
FIG. 4 is a block diagram showing, by way of example, the AI agent's hybrid AI architecture of FIG. 3 with output from the cognitive system.

Subsequently, the learning system interacts with other elements in the agent's hybrid AI architecture. FIG. 4 is a block diagram showing, by way of example, the AI agent's hybrid AI architecture 50 of FIG. 3 with output 51 from the cognitive system. Specifically, learning system 42 provides the policy to the cognitive system 43 to produce alternative, competing plan options 51. Any of these plans can be executed by the performance system 44.

Figure 5:
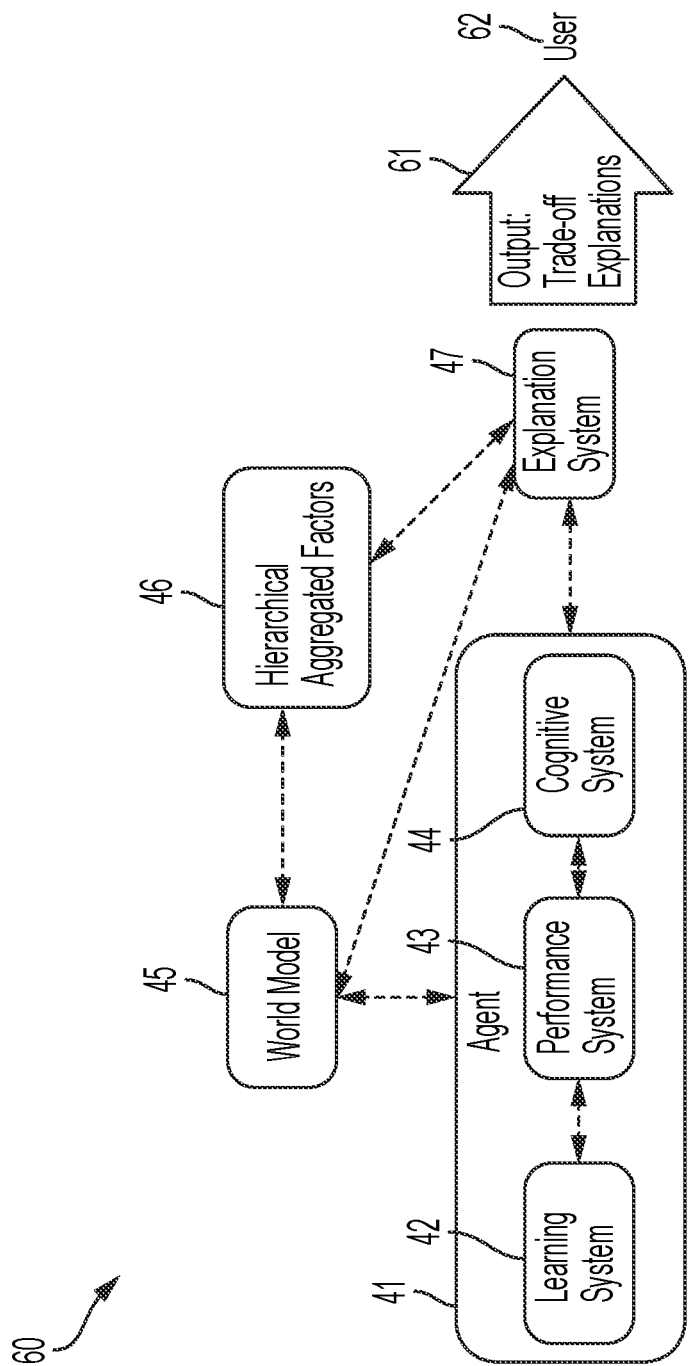
FIG. 5 is a block diagram showing, by way of example, the AI agent's hybrid AI architecture of FIG. 3 to generate an explanation.

In addition to being able to learn to solve a problem, an explainable AI system has to be able to provide explanations about how it works. The explanations can be provided to human stakeholders, who are trying to understand how the agent makes decisions and what the agent will do in different circumstances. FIG. 5 is a block diagram showing, by way of example, the AI agent's hybrid AI architecture 60 of FIG. 3 to generate an explanation. Interactions among the system components occur to produce explanations 61 from pairs of options. The explanation system 47 utilizes the competing plans from the cognitive system 44, while the agent compares the performance of the alternative plans using the world model 45 and evaluates them using the hierarchical aggregation factors 46 to select a plan and generate an explanation. The explanation of a plan selection can include text, visualizations, charts, and summarizations and can be created for comparing alternative options.

Generating and Visualizing Competing Plan Options

Figure 6:
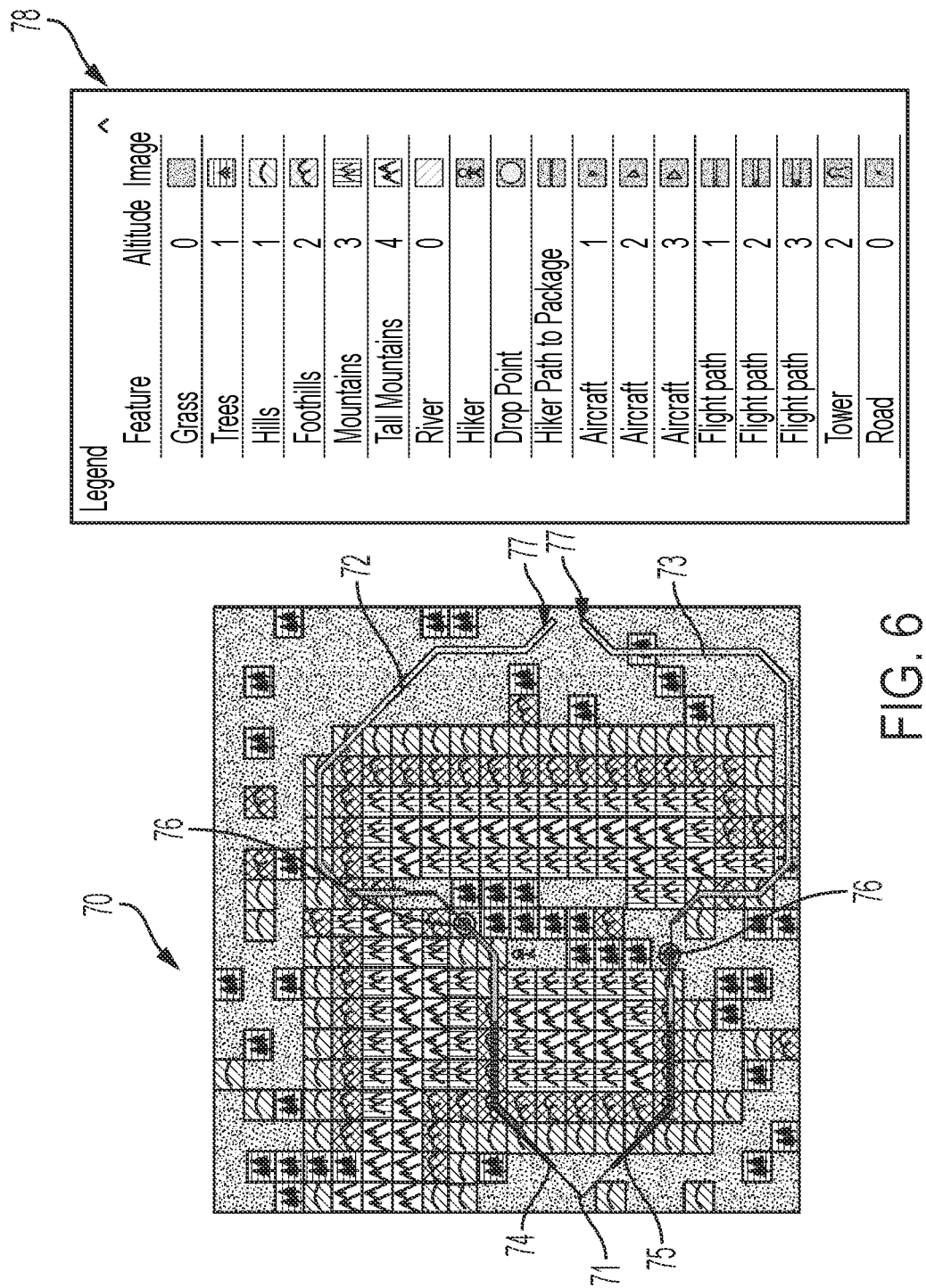
FIG. 6 is a block diagram showing, by way of example, two competing plans on a single map.

Competing candidate plans can be displayed for viewing differences in the plans. FIG. 6 is a diagram showing, by way of example, two competing plans on a single map 70. Each plan 72, 73 can include a start origin 71, a drop off point 76, and a destination 77. The drop off point 76 can be represented by a target icon indicating a package release point for the drone. After release, packages scatter as they drop to the ground depending on the distance. An agent must plan a route that drops packages safely and conveniently for the hiker.

A width of a line 74, 75 outlining each path 72, 73 can reflect an altitude of the drone. For example, as the drone moves closer to the surface of the earth, the width of the line is narrower than when the drone flies at higher altitudes. A color of the lines 74, 75 can differ to provide a better visualization for a user to determine when and where the path may cross itself or another path.

A legend 78 can accompany the map to provide details regarding symbols in the map. For example, the symbols can include mountains with low, medium, and high-altitude peaks, trees, and flat land. There are also forested areas represented by tree icons and grassy lands. Knowledge of the terrain is used in generating the plans to ensure that the drone can fly along the path associated with the plan.

Figure 7:
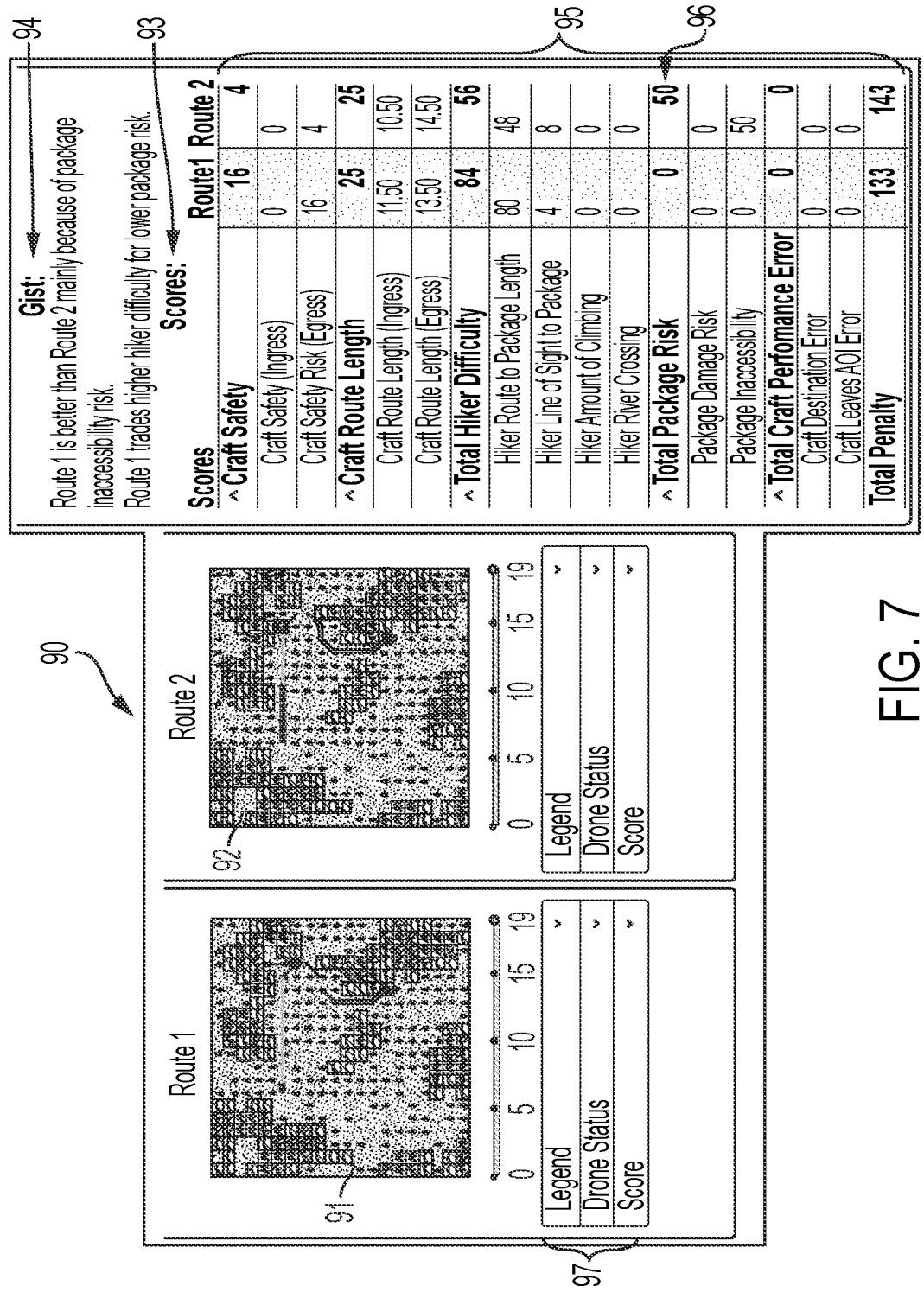
FIG. 7 is a block diagram showing, by way of example, a multi-part explanation for competing flight plans.

Visualizations of the competing candidate plans can be provided with scored aggregation factors and a gist, as an explanation. FIG. 7 is a diagram showing, by way of example, a multi-part explanation 90 for competing flight plans. The multi-part explanation 90 can compare multiple competing candidate plans 91, 92 and can include maps 91, 92 of flight plans for drone delivery, plan information 97, a score summary 93, and a gist summary 94. The plan information 97 includes a legend for the map, which can be available via a drop down meu or displayed below or adjacent to the plan, a status of the drone to fly the route of the candidate flight plan and scores for the factors. The score summary 93 includes a hierarchically-organized display of aggregation factors 95 and scores 96 for those factors for each plan 91, 92. An evaluation score can be calculated based on one or more of the factors in the score summary. For example, a score for a total factor for risk can be based on package risk and hiker risk, while a score for time can be based on a hiker time to hike to the package and an ingress time. To determine the evaluation score, the scores for the factors associated with the evaluation score is added. For example, an evaluation score can be determined for risk and time. Subsequently, one of the plan options can be selected based on the evaluation scores for risk and time.

The gist summary 94 can provide an explanation or narrative as to why one plan option is better than other plan options and in one embodiment can summarize trade-offs between the two plan options and can be determined using the factors 95. Specifically, the purpose of the narrative gist provided by the explanation system is to help a user to understand more deeply the rationale for choosing between competing solutions. In the current example, the gist can be computed based on information in the table of the hierarchically organized factors and simulation data available from the world model, the AI pilot's plan, and its performance policy which chooses operations when it is in a particular state.

One form of gist explanation is a trade-off explanation such as: "Route 1 is better than route 2 mainly because of package inaccessibility risk. Route 1 trades higher hiker difficulty for lower package risk." As described below in further detail, this narrative can be computed by identifying the most important factors used to consider that drone 1 has more favorable penalties than drone 2. This explanation focuses on what is different between the two flight plans. Designers and planners have shared understanding that different choices and also compromises may be made across factors. For this reason, explaining by showing trade-offs factors provides provide insight into rationale.

Other forms of narrative gist explanations can also be useful. For example, when two AI pilots for drones have different knowledge or experiences, they make different choices. A user may benefit from knowing not only what trade-offs are involved in a choice but also why the AI makes that choice. Why does the AI prefer one choice over another? Here is an example of an explanation revealing more of the knowledge or experience behind a choice: "Drone 2: Falcon is able to drop the package where there is lower package risk because only it knows that the hiker hikes quickly." This explanation is more causal and shows that drone 1 lacks knowledge about the hiker that drone 2 has.

From a perspective of agent rationality, drone 1 assumes that the hiker is typical and has typical hiking abilities. This causes drone 1 to underestimate hiker speed and therefore to prefer plans where the hiker has shorter paths. Here is another example: "Drone 1 has the better AI drone plan because it violates no constraints. Drone 2 does not know that the hiker hikes slowly and estimates the hiking time as for a typical hiker. Drone 2 violates the maximum package retrieval time." In this second example, lack of knowledge by drone 2 causes it to expect faster speed from the hiker and leads the drone to planning a route that fails to deliver the package on time.

A third example: "Drone 1 drops the package where there is lower package inaccessibility risk because it can safely get close to obstacles." In this example, drone 1 has a flying skill advantage. This enables drone 1 to take flight plans that that would be too risky for drone 2." The analysis for these gists uses the same computational machinery as the trade-off explanations. The explanation system simply flies both drones on exactly the same flights and looks at the simulator predictions based on each pilot's model. Lack of knowledge about the hiker shows up as a difference in the AI pilot's prediction of the hiker's hiking time. Different skills for flying show up as differences in risk assessments by the simulator when the craft goes through a narrow mountain pass or near other obstacles. The benefit part of the advantage and benefit explanations is the same as the main factor in the trade-off explanations.

In summary, by using the information in the factor table, simulator, and agent policy, the explanation system can create a short narrative gist that provides insight into important trade-offs across plans and also insight into differences between AI agents that lead them to choose those trade-offs.

Figure 8:
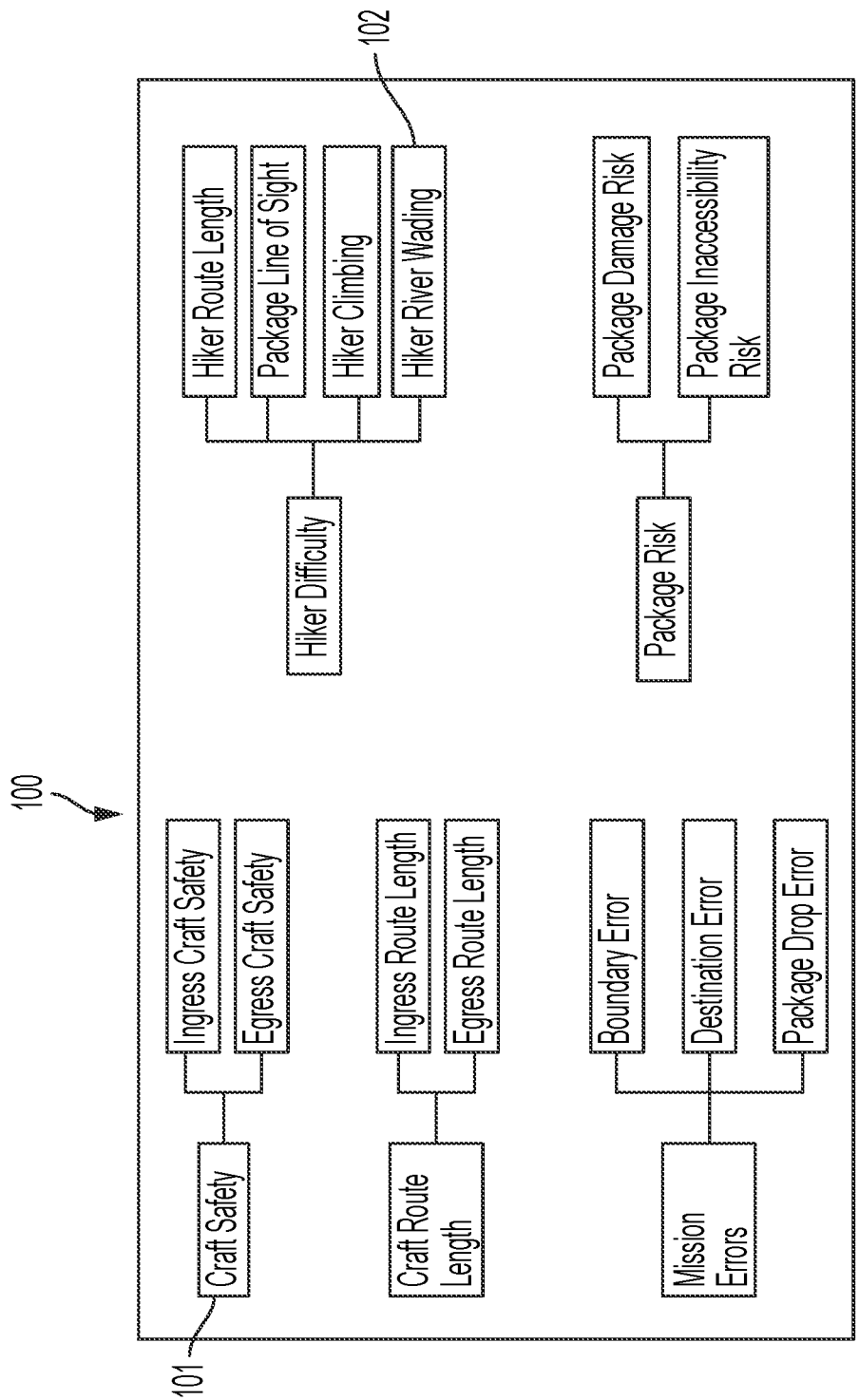
FIG. 8 is block diagram showing, by way of example, an aggregation and abstraction hierarchy for aggregation factors.

To determine the gist, the factors are scored and compared for the different flight plans. When hierarchically organized, the factors can include subfactors. FIG. 8 is block diagram showing, by way of example, an aggregation and abstraction hierarchy 100 for factors. The abstraction and aggregation hierarchy 100 for factors used in the service drone can include factors 101 for craft safety, craft route length, mission errors, hiker difficulty, and package risk. Other factors are possible including for determining drone flight plans or for other activities. These aggregation factors are considered as the AI agent generates competing plans for missions and chooses among them. Each factor can be represented as a parent node 101 and correspond to a measurement in a class of situations for an application. For example, the craft safety factor corresponds to a measurement in situations of risk to the safety of a service drone, while hiker difficulty corresponds to a measurement of difficulties faced by the hiker in finding and reaching a dropped package of provisions. Other hierarchical factors are possible such as a time factor for total package delivery time can include a hiker hiking time and a craft flying time. The hiker hiking time can include hiker route time, package line of sight delay, hiker climbing delay and hiker water crossing delay, while the craft flying time can include ingress route time.

Subfactors correspond to different sub-classes or cases of their parent factor. For example, the subfactors for hiker difficulty can include hiker route length, package line of sight, hiker climbing, and hiker river wading. The subfactor route length refers to the distance that a hiker would hike to reach a package and corresponds to one source of hiker difficulty. Hiker climbing refers to additional difficulties if the hiker needs to climb to reach the package delivered by the drone, while hiker river wading refers to additional difficulties if the hiker needs to wade into a river to reach the package.

The hierarchical trees of factors and corresponding subfactors are aggregation trees because the value for a parent node is the sum of the difficulties of its sub-nodes. They are called abstraction trees because the parent factor corresponds to an abstraction that covers the meanings of its subfactors. These hierarchies can simplify the description of patterns of decision trade-offs to human users, thereby improving the understandability of explanations. An explanation that uses the name of the abstract parent factor conveys a more inclusive and general characterization than any of its more specific subfactors.

In one embodiment, the factors are defined by human curators who are familiar with the application domain and assign names suitable for the common ground terms with users. In the aggregation and abstraction hierarchy for the service drone application, the definition of aggregation factors is informed by a causal relationship in the HMF model for the application domain.

For example, the package risk factors are based on a causal model for what happens when packages are released by a drone. When dropped from a drone, a package can drift a distance during the fall according to the distance to the ground. The risk for a package depends on the likelihood of landing in a place where there are package safety or package inaccessibility issues. Packages can be damaged according to where they land. The curators of the factors recognize that parachutes for packages can become tangled in trees-making packages inaccessible. A package can also become inaccessible if dropped high up a mountain slope, beyond where a hiker would reasonably climb. Packages can also be damaged if they land in a river or on various kinds of objects in the world model. Each factor has a corresponding evaluation function which assigns penalties according to where the package is likely to land.

Similarly, the evaluation function for the hiker difficulty factors can use a causal model. The difficulty for the hiker can depend on how far the hiker must hike to reach the expected landing location of a package. Difficulty increases if the hiker has to wade into a river and also increases if the hiker needs to climb up or down hills to reach a package or needs to walk on rocky ground on a hill. An increase in difficulty can also occur if the hiker is unsure about the landing location of the package because obstructions block the line of sight to the package. In this way, each of the subfactors of hiker difficulty reflects classes of difficulty consistent with a causal model.

The other factors can also be defined according to causal models. The cost of flying is reflected in route lengths for ingress and egress to a release point, including costs for changes in altitude. Craft safety reflects risks imposed by the terrain as a craft navigates. If a craft goes through a narrow passage, there is a risk that wind or turbulence will cause it to crash into nearby obstacles at the altitude of the craft.

The logic and organization of factors is organized logically to reflect natural risks and constraints of the application domain. At a minimum, the abstraction and aggregation hierarchies have the following properties:

The factors are organized as a tree. If there is no single root or top factor, the factors are organized as a "forest".

Factors have natural language labels.

A parent factor corresponds to a more abstract meaning than its subfactors.

For every option considered by an agent in a situation, there is a method for computing the penalty or reward for every leaf factor.

Scores are assigned to each factor for each plan. The score for a parent or aggregation factor is the sum of the scores of its subfactors.

Returning to the discussion with respect to FIG. 7, a visual inspection of the maps of the competing plans shows that route 1 has greater hiker difficulty, since it requires the hiker to walk farther to reach the package. Further, consulting the hierarchical factor table, we see that the main penalty difference between the two routes comes from package risk. Accordingly, the gist explains that route 1 trades higher hiker difficulty for lower package risk. In route 2, the agent drops the package over a forested area where there is a high risk that the parachute will get caught in the trees, making the package inaccessible. Generating the gist is further discussed in detail below with respect to FIGS. 7, 10, and 12-14.

Figure 9:
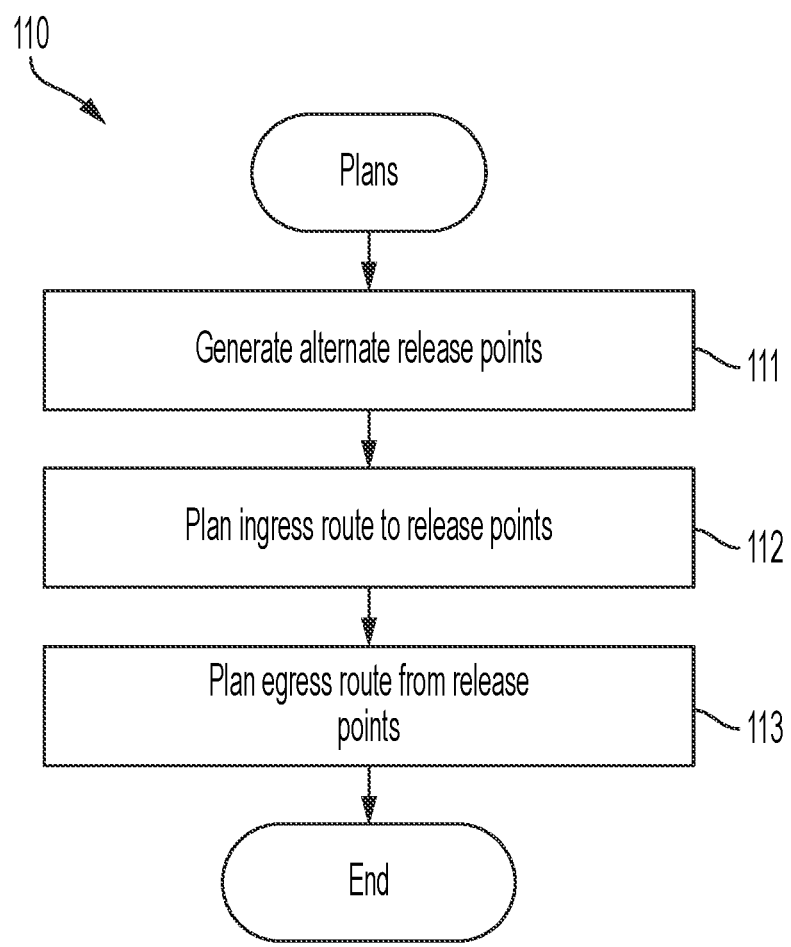
FIG. 9 is a process diagram showing, by way of example, a method for generating candidate plans for a task or mission to be completed.

In the service drone application, the hybrid system architecture enables the AI agent to partition the task of an overall mission problem into nearly-independent parts. FIG. 9 is a process diagram showing, by way of example, a method 110 for generating candidate plans for a task or mission to be completed. The agent first produces (step 111) a set of alternative release points based on one or more factors, such as hiker difficulty and package risk aggregation factors. For each alternative release point, the agent then plans ingress (step 112) and egress (step 113) routes to the release point, using one or more factors, such as the craft safety and craft route length aggregation factors. The ingress and egress routes can be determined simultaneously or consecutively. The position and orientation of the craft for ingress and egress are matched at the drop point.

The service drone task is partitioned into three parts, including plan a release point, plan an ingress to the release point, and plan an egress from the release point. This partitioning is enabled by the hybrid AI architecture and confers advantages in reducing the complexity of the problem. In a search formulation for a planning system, planning is partitioned into separate subproblems for selecting a release point and planning the ingress and egress aggregation factors A candidate plan, once generated, specifies all of the steps in a mission plan. This generate-and-test process configures a set of competing candidate plan options for different release points that make different trade-offs. For each plan option, a total aggregated score is computed using the hierarchical aggregation factors. An oversight module then evaluates the alternative options of the plans and selects the plan with the lowest total score or penalty.

A gist, or narrative explanation, of the plan selected is also generated. A gist can convey an important piece of information about something without detail and helps to organize knowledge around a main point. Simply, a gist conveys an approximate understanding and avoids the complexity of details, exceptions, and edge cases.

Generating Effective Gists for Explanations

When users have multiple distinct agents that they want to understand, they need to learn to see situations as each agent does. In the context of the service drone application, the users can notice whether one agent tends to favor risky routes to reduce route length, or another one tends to favor routes that focus on reducing hiker difficulty versus reducing risks to craft safety or route length. Restated, users can learn to distinguish different preferences for different computational agents.

When an explanation system provides a factor table as a kind of explanation, the user can use the aggregation factor table to see a summary the effects of the agent's decisions. For example, users can compare the influences of different factors in considering a mission situation and can work through multiple examples of how a computational agent acts in different situations.

In the examples in the figures, the understanding of agent behavior is based in part on the expectation that the agent is rational based on what it knows. A rational agent performing a mission chooses an optimal plan given a set of specific criteria. For machine learning systems, this capability requires that the agent has encountered similar-enough examples in its learning mode and has been sufficiently trained to convergence.

Principles for generating gists that summarize trade-offs across a pair of options are provided below:

- Principle: First compute factor penalties for leaf and aggregate factors. Each aggregate factor's contribution is computed as the sum of the contributions of its subfactors.
- Principle: Identify and report the best option. Given a situation and at least two options, identify the option with the lowest penalty as the best option and report it. For example, "Route 1 is better than route 2".
- Principle: Identify the main factors. A main factor is a penalty factor in the bad option that accounts for a large share of the penalty advantage of the good option. In one embodiment, a main factor accounts for 40% or more of the penalty difference between two options. In another embodiment, a main factor is one whose penalty is a major share of the total penalty.
- Principle: Identify the appropriate aggregation level for reporting main reasons. If there are multiple subfactors for a main reason factor and some subfactors individually contribute a substantial share of the penalty (such as 40% or more), and there are additional subfactors besides those subfactors, identify those subfactors as the main factors. Otherwise identify the parent factor as the main factor.
- Principle: Report the identified main factors. For example, "Route 1 is better mainly because of a shorter craft route" or "Route 1 is better mainly because of lower hiker difficulty and lower package risk."
- Principle: Identify and report any main penalty factors. Intuitively, a good option accepts a small penalty disadvantage in one factor in exchange for a larger penalty advantage in another factor. The disadvantaged factor in the good option is the one with the greatest disadvantage across the factors; the advantaged factor is the main factor described already. An example of a trade-off statement is "Route 1 trades higher egress craft safety risk for lower hiker inconvenience." Another example of similar logic and language is "Drone 1 drops the package where there is lower package inaccessibility risk, because it can safely fly close to obstacles."

An example of computing a gist statement using pseudocode is provided below and can correspond to multiple pages of Python.

Create factor tables.
    For each option, create a factor table and store the values of the factor penalties.
Compute total penalties.
    Compute the total factor penalty for each option.
Identify good and bad options.
    The good option is the one with the lowest total penalty. The bad option has the highest penalty.
Compute the penalty deltas for the factors
    For each factor, the delta is the good option factor penalty—the bad option factor penalty.
Identify main factors
    The main factors are the list of factors contributing >40% of the positive deltas.
    If a subfactor contributes more than 75% of the delta for its parent top-level factor, identify the subfactor instead of the parent factor.
Report the good option and the main factors
    Report the good option as the best. If there are main factors, report that the choice is mainly due to the main factors.
Compute the reverse deltas
    For each factor, the reverse delta is the bad option factor value—the good option factor value.
Identify aggregation factors
    The aggregation factors is the list of factors contributing >40% of the positive reverse deltas. (Do not substitute sub-factors for factors, even if their contribution is large.)
Report aggregation factors
    If there are aggregation factors, report that the good option makes a trade-off between the aggregation factors and the main factor.

Different embodiments of this invention can employ variations in how gist is computed and reported, as well as different values for determining main factors and secondary factors. The example above describes the calculation of a gist for a pair of options. If more than two options are being considered, a gist can identify the best option and then make comparison statements between the best option and each of the other options. In computing the main factors, one or two factors can be returned if they are large enough and subfactors can be substituted for main factors if the subfactors contribute most of the delta. Variations in the approach could the following: report only main factors, report only a top main factor, report, at most, one main subfactor, or report two or three subfactors that dominate, depending on how many subfactors there are. In further variations, for abstraction and aggregation factor hierarchies with more than two levels, the method could descend down the hierarchy to consider dominant child subfactors, grandchild subfactors, and so on. Other variations are possible.

The example above for computing a gist reports child subfactors as the main factors but only considers top-level factors in its trade-off statements, which provides a depth of explanation for the main factors giving users instructions about the main source of an advantage for an option in the situation and encouraging users to remember that pattern. Also, in the example above, only top-level factors in the trade-off statement are reported, rather than considering major subfactors. This approach is intended to teach users a general perspective on trade-offs that may be easier for them to internalize and remember.

Figure 10:
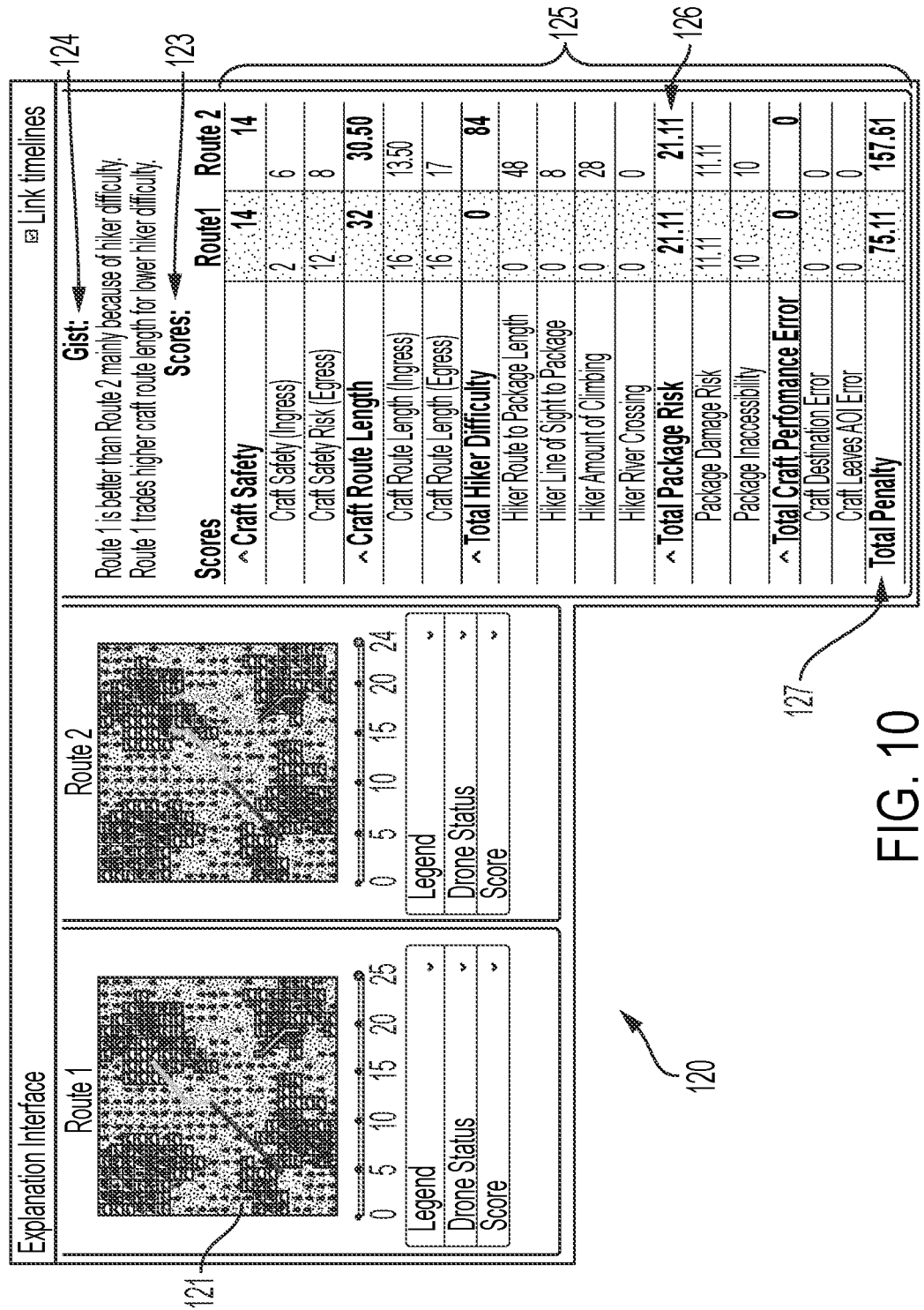
FIG. 10 is a diagram showing, by way of example, a multi-part explanation for a different set of competing flight plans.

In another comparison of flight plan options, importance can be placed on different factors than those described above with respect to FIG. 7 to identify a good option plan and generate a gist. FIG. 10 is a diagram showing, by way of example, a multi-part explanation 120 for a different set of competing flight plans. The multi-part explanation 120 can include maps 121, 122 for a first flight plan route and a second flight plan route, a score summary 123 with scores 126 for factors and subfactors 125, and a gist summary 124.

Based on the factor scores for routes 1 121 and 2 122, route 1 is identified as the best option because the total penalty score 127 for the factors of route 1 is less than the total penalty score 127 for route 2. At least one main factor is identified as the factor in the bad option that accounts for a large share of the penalty advantage of the best option. Here, the agent places greater importance on low hiker difficulty, as would be appropriate for missions where an injured hiker could be limited in his or her ability to move, which is supported by the scores between the routes for the hiker difficulty factor. Specifically, a score of zero is assigned to route 1 for the factor hiker difficulty, whereas a score of 84 is assigned to route 2. Thus, hiker difficulty is identified as the main factor.

In this example, the drop point of route 2 is directly above a low hill one tile west of the hiker. The difference in altitude interferes with the line-of-sight between the hiker and package. The hill also requires the hiker to climb to reach the package. In contrast, the drop point of route 1 is in the vicinity of the hiker, which is represented as a target in the same box of the hiker in the map and indicates a low hiker difficulty. The penalty factors and scores reflect how the agent recognizes these issues.

Additionally, the main penalty trade-off is also determined. The best option accepts a small penalty disadvantage in one factor, which is the aggregation factor, for a larger penalty in another factor. In this example, the score for the craft route length factor is less for route 1 than route 2. Accordingly, there is a penalty disadvantage in route 1 for craft route length, which is selected as the penalty aggregation factor.

Subsequently, the gist 124 is generated for the two options, route 1 and route 2. The gist 124 includes the best option selection, which is route 1 and utilizes the main factor to explain why route 1 is selected. For example, route 1 is better than route 2 mainly because of hiker difficulty. Additionally, the aggregation factor is identified to provide a summary of one or more factors where the agent places importance. Here, the aggregation factor is craft route length, which is further in route 1. Thus, the statement for trade-off can include route 1 trades higher draft route length for lower hiker difficulty, which shows higher importance based on the hiker difficulty factor.

Drone maneuvers are shaped by the constraints of flight dynamics. Dropping a package to a precise location requires that a drone descend to a low altitude to do the release. However, descending to a low altitude creates other risks. After a drone drops a package, it continues flying at the same altitude and same direction for one more tile length. If the next tile on the route after the drop point has a tree or other obstacle at the drone's level, the drone will crash into it.

Similarly, sometimes constraints bearing on one part of a plan can affect action choices in distant parts of the plan. For example, depending on the terrain, getting the drone in position to drop a package safely and conveniently for a hiker can require distant considerations about the route for getting there.

Visualizing Penalties in Regions

A motivation for creating explanation systems is that users want to understand AI agents before they use them, especially in critical applications. The lack of understanding about how opaque or black box AI agents make decisions is recognized as a barrier to the adoption of AI technology.

For instance, explanations can be provided when the user has a need to understand something. That happens when they have a violation of expectations. They think that the drone or system will do something, but actually does something else and asks "why?" What am I (the user) not noticing, not recognizing, or not reasoning about?

Providing a combination of gist and visual presentations as an explanation to the user can help solve problems, such as a user not knowing where to look (gist) and what's important, not noticing it in the setting, notice it but not recognize what it is, and recognizing what it is but not integrating it into the reasoning or decision process.

For at least some of the factors—there is a visualization that explains how to recognize the effect of that factor. For instance, craft safety (a factor) can show altitude of a craft plus altitude of stuff nearby that is a risk in windy weather. Consider the situation where an experienced user observes an AI system on a task in multiple situations. The user is concerned about a different situation of interest that is coming up and wants to predict what the AI system will do in the new situation. The following steps for a simplified cognitive process model of the user is provided below:

1. The user reviews a new situation of interest.
2. The user recalls patterns from similar known situations where the user has observed the agent's behavior.
3. The user analyzes similarities and differences between the new situation and the previous ones. Based on the analysis, the user predicts what the agent will do.

An important issue for the cognitive model of this task is "How can a user know what is important about the new situation and what to focus on?" Reframed, "How does the agent perceive the situation?"

The approach of the gist explanation mechanisms suggests an additional explanation mechanism for step one in the cognitive process model above by helping the user to perceive the situation like the agent and to determine where to focus. An AI may agent prioritize having short route lengths to enable fast package delivery. The main factor portion of gist would be something like "Route 1 is better than route 2 mainly because of lower craft route length."

Figure 11:
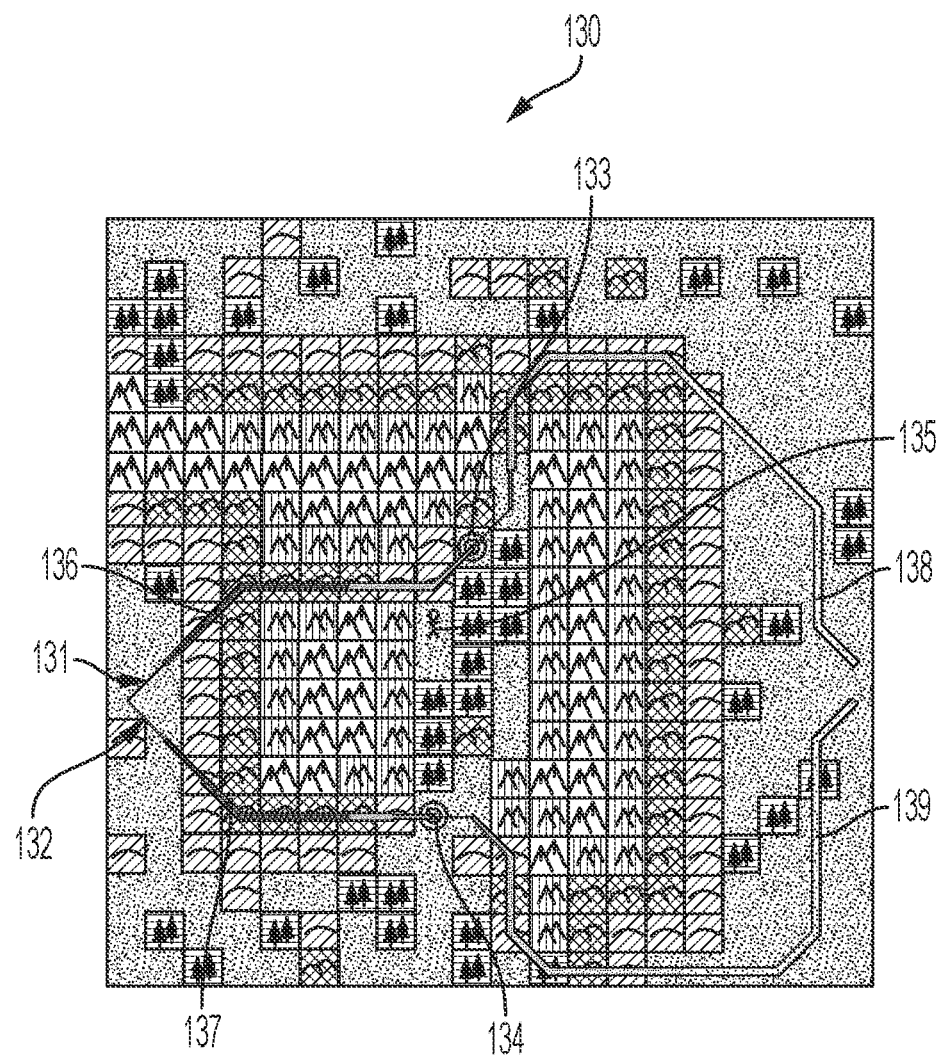
FIG. 11 is a diagram showing, by way of example, a map with two different drone routes.

In reviewing the situation of interest using a visualization, such as a map, the user could verify visually that the craft route length for the first option is shorter than craft route length for the second option. FIG. 11 is a diagram showing, by way of example, a map 130 with two different drone routes. In route 1 131, the craft takes a narrow shortcut through the mountains enabling it to drop the package 133 close to the hiker 135. Route 2 132 drops the package 134 near the mouth of the canyon, further from the hiker 135. The ingress route 136, 137 lengths, from an origin of the drone to the package drops 133, 134 are similar.

The egress routes 138, 139, measured from the package drop points 133, 134 to an end of the drone route have different lengths. In route 1, the agent takes another shortcut through the canyon wall to be positioned for a fairly direct path to the destination. The egress on route 2 is more roundabout and longer. Thus, the map supports a finding that route 1 is better than route 2 mainly because of lower craft route length.

A trade-off statement for this example informs the user about important things to look for in the situation and can include route 1 trades lower craft route length for greater craft safety risk and greater hiker difficulty. To understand the craft safety factor in the situation, the user needs to be able to notice where the agent takes greater risks in route 1, and in what way the hiker difficulty is greater. The map can provide a visualization where particular map locations, such as tiles, are tinted orange to indicate where there are significant craft safety risks. For example, the map cells can be colored orange where the agent flies the craft through the shortcut into the canyon area. There is a higher craft safety risk in these cells because a wind could blow the craft into the walls of the narrow shortcut passage. There is also a craft safety risk at the drop point where the agent flies the craft low to make a precision drop, but there are low hills and trees in the cells surrounding the drop point. Finally, there is a craft safety risk on egress where the agent flies the craft through another canyon wall.

Such visualizations can show where significant penalties accrue for any factor. For example, the visualization could also show where there are higher penalties for hiker difficulty, package safety, or hiker river crossing. Providing such visualizations for factor penalties can help a user to see the situation like the agent does and therefore to more readily think like the agent. The visualizations can also help users to more quickly and accurately assess situations the way that an agent does and understand more readily what agent policies may be best for an application.

A user could bring up such a visualization for a particular factor in an event option, for example, by selecting the corresponding entry in the factor table and selecting an interactive menu option to highlight characteristics for that factor. Other ways of triggering the visualizations are possible, including automatic tours though the factors or clicking on phrases in a narrative gist.

Several variations are possible for indicating penalty regions in options. For example, visualizations, such as the orange cell color, can be provided as a transparent overlay over the high-penalty cells. Other variations for display, such as crosshatch patterns, outlines, and different colors are possible. In addition, interaction patterns could be created to enable a user to go back and forth between penalties across options or to see the corresponding regions where different options accrue penalties. Other variations can enable users to differentiate between different kinds of risks at once. For example, in the service drone application, hiker difficulty risks can be caused by subfactors for hiker route length, hiker climbing, line-of-sight, and river crossing. Other variations can show the same or multiple risks across routes to allow visual comparison. Such variations are intended to aid users in being able to more readily internalize how an agent perceives and evaluates situations.

Computing visualizations of penalties requires a capability in the AI architecture for an agent. Factor penalties require an interaction between the world model, the hierarchical aggregation factors, and the explanation system. The explanation system uses evaluation methods for an option to step through the aggregation factors and to assess the situation in the world model. Computing visualizations of situations requires a way of mapping the features of situations onto a display.

Showing regions of penalties can use similar calculations to map penalty densities. When a penalty-computing function for a factor determines that there is a penalty in part of the world model, what is needed is to log the location for the penalty display. This penalty indication could be treated as an additional meta-property in the world model or could be stored externally using exportable world coordinates or object identifiers. A penalty visualization routine can then incorporate the penalty visualization in a view of the world model.

Factors Versus Subfactors

Figure 12:
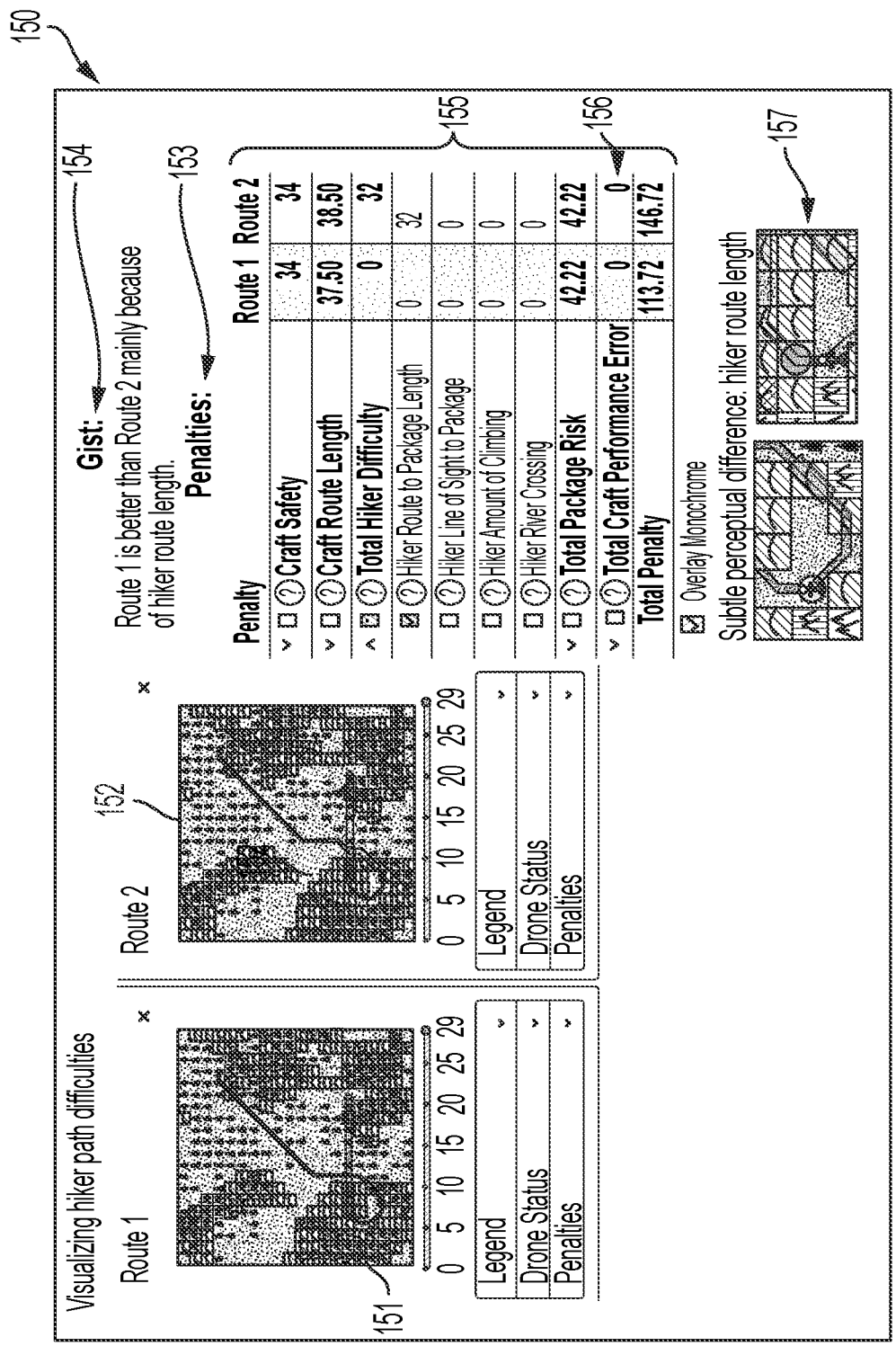
FIG. 12 is a diagram showing, by way of example, a multi-part explanation for different route options.

As briefly mentioned above, certain subfactors may play a large role in determining a penalty for the associated factor and can be used in the gist. FIG. 12 is a diagram showing, by way of example, a multi-part explanation 150 for different route options. The multi-part explanation 150 includes maps for a first route 151 and a second route 152, a list of penalty factors 153 with different factors and subfactors 155, and scores 156 for the factors and subfactors. A closer view 157 of relevant areas of the map for one or more factors can also be displayed in the multi-part explanation 150.

Within the factor list 153, each factor and subfactor in the list can be associated with a selectable box that when selected, reflects changes to the visual map of both routes. Specifically, the changes can include a display reflecting areas of the real world map that are associated with the selected factor or subfactor. The box associated with the factor for total hiker difficulty and subfactor hiker route to package length has been selected for visualization. In the real-world visualization for Drone A, the package will be released to the hiker at the hiker's location and for Drone B, the package is to be released to the user in the area represented by the orange square. Such visualization allows a user to easily view the distance a hiker must walk to collect the package.

In this example, the gist indicates that route 1 is better than route 2 mainly because of hiker route length. Hiker route length is a subfactor of the factor hiker difficulty. Using the rules described above, the subfactor was determined to account for enough of the total hiker difficulty score that the subfactor is selected for the main factor.

Figure 13:
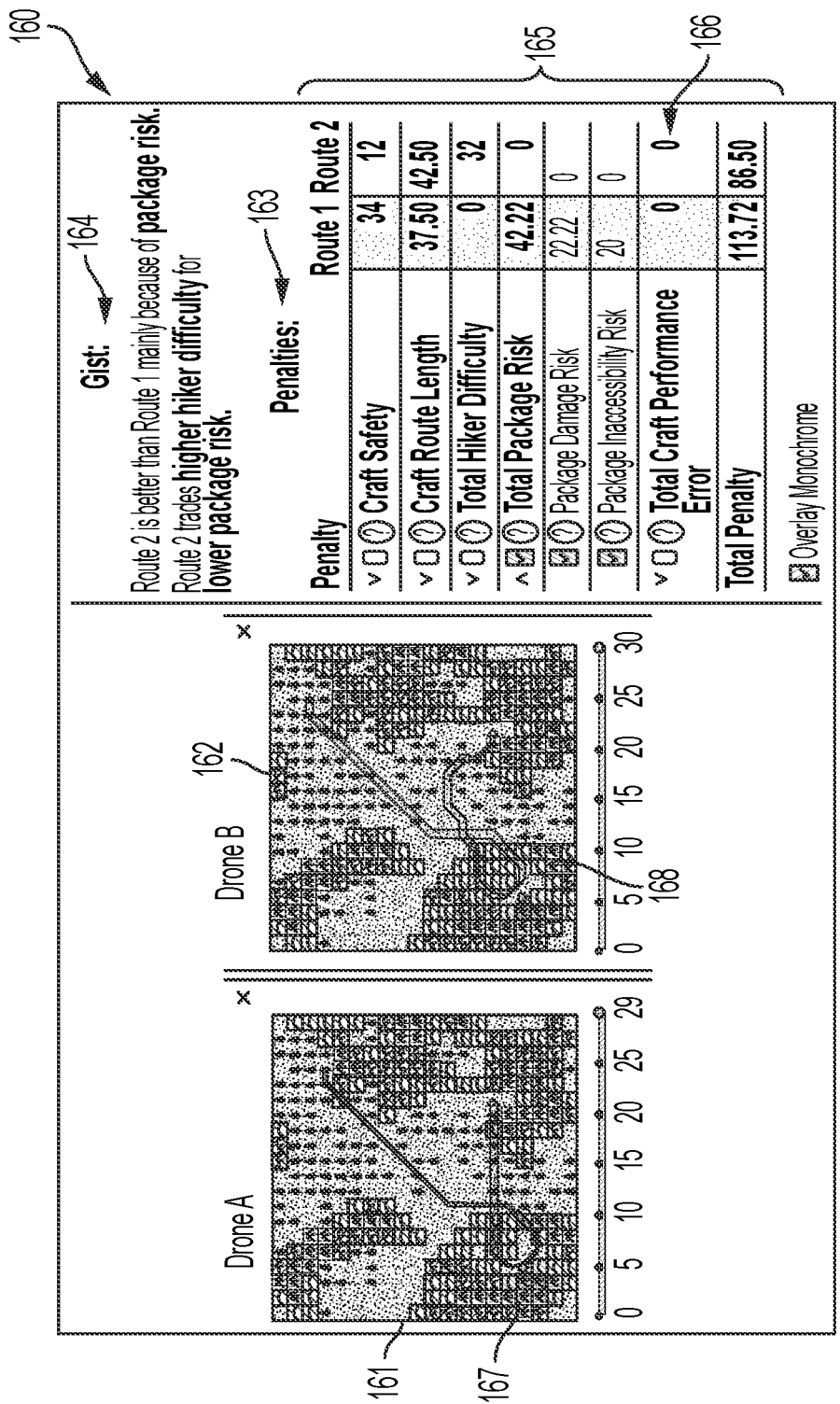
FIG. 13 is a diagram showing, by way of example, a multi-part explanation with visualization for a particular factor.

In another example, a different factor can represent the main factor. FIG. 13 is a diagram showing, by way of example, a multi-part explanation 160 with visualization for a particular factor. The multi-part explanation 160 includes maps for a first route 161 and a second route 162, a list 163 of penalty factors and subfactors 165 with scores 166, and a gist explanation 164. The gist provides that route 2 is better than route 1 mainly because of package risk. Route 2 trades higher hiker difficulty for package risk.

The factor for total package risk and subfactors for package damage risk and package are selected for visualization. The real-world visualization for Drone A shows a 3×3 grid 167 of highlighted squares that represent the total package risk, while the visualization for Drone B shows a different 3×3 grid 168 of highlighted squares representing the total package risk. Each set of highlighted squares 167, 168 are determined based on the subfactors for package damage risk and package inaccessibility risk for the drone route provided and identify areas in the map associated with risk for those subfactors.

Figure 14:
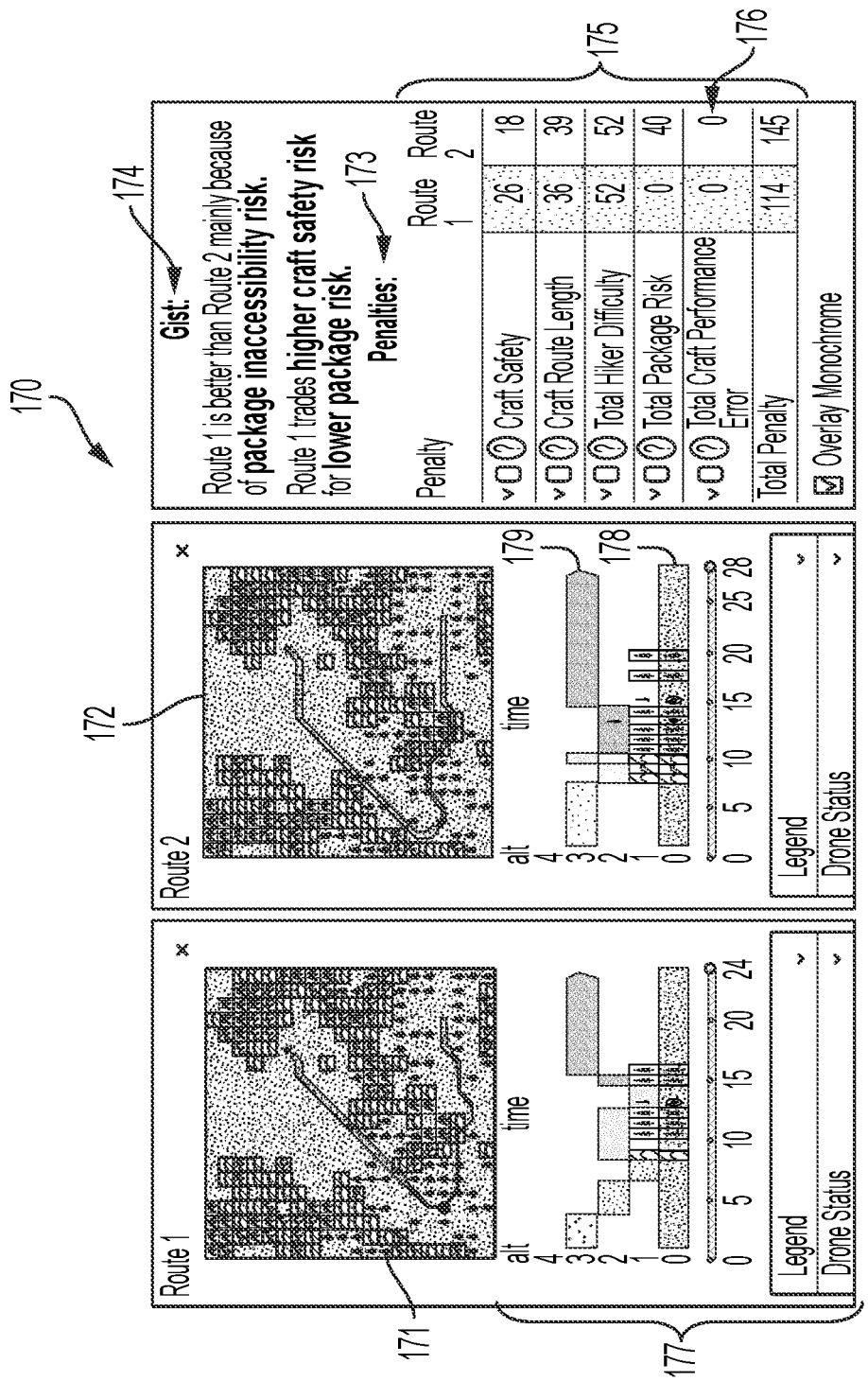
FIG. 14 is a diagram showing, by way of example, a multi-part explanation with visualization for a particular factor.

The factor for package risk can be visualized differently than using highlighted squares. FIG. 14 is a diagram showing, by way of example, a multi-part explanation 170 with visualization for a particular factor. The multi-part explanation 170 includes maps for a first route 161 and a second route 172, a list 173 of penalty factors and subfactors 175 with scores 176, and a gist explanation 174. The gist provides that route 1 is better than route 2 mainly because of package inaccessibility risk and route 1 trades higher craft safety risk for lower package risk.

Each map has a graph located below to provide the user with a different type of visualization for elevation and drone height 177 to help the user learn to see above objects along the flight path. A green line 178 can show elevation of the land along the drone route, while a different colored line 179 adjacent to the green line can show elevation of the drone along the path. With respect to the elevation line, the higher the line, the higher the elevation. Similarly, with respect to the colored drone line, the higher the line, the higher the drone is flying over the ground.

Partitioning Factors by Subgoals

As autonomous systems are used for larger real-world tasks, their activities need to encompass richer and more diverse domains. For example, consider an expanded version of the service drone task with an additional subtask to locate the hiker before delivering provisions. In this example, we assume that the hiker's location cannot be determined by simple means, such as by GPS on the hiker's phone (because the phone battery is dead) or satellite imagery (because there is no satellite availability or too much cloud cover).

Figure 15:
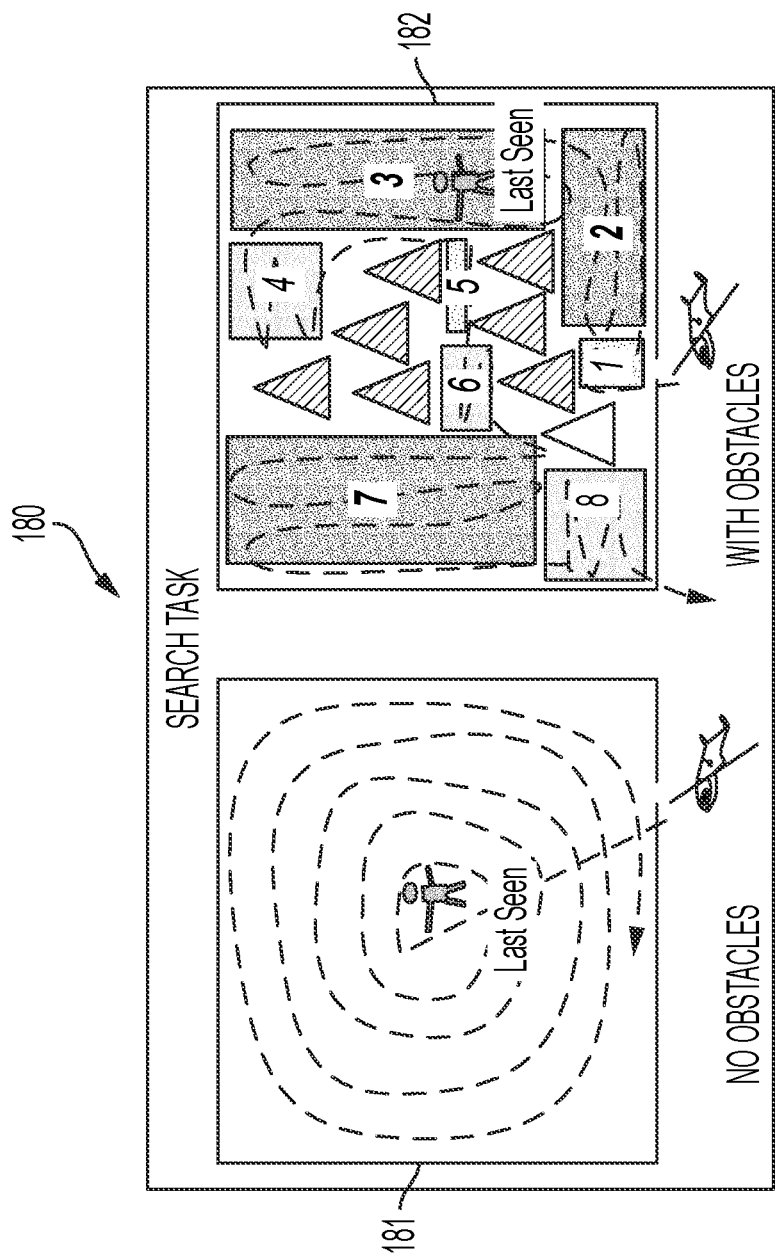
FIG. 15 is a diagram showing, by way of example, a display with two regions where the search for the hiker could take place.

FIG. 15 is a diagram showing, by way of example, a display 180 with two regions where the search for the hiker could take place. One region 181 displays a path with no obstacles, while a different region 182 displays a path with obstacles. Specifically, the path with no obstacles is represented by a dotted line in a spiral flight path for the drone searching for the hiker. The drone starts where the hiker was last seen and spirals out until finding the hiker or upon reaching the limits of the search region.

The other search region has a configuration of mountain obstacles that the craft must avoid while carrying out the search. In the obstacle path, the hiker was last seen in sub-region 3. The flight plan starts at the middle of the south boundary of the search region. The challenge is to find a path that checks every accessible sub-region for the hiker. The agent first searches the convex sub-region 1 where the drone enters the search region. If the drone does not encounter the hiker, the agent then directs searches in sub-regions 2, 3, and 4. Assuming that the hiker has not yet been spotted, the drone path backtracks through sub-region 3 and then searches sub-regions 5, 6, 7, and 8. If at any point the hiker is spotted, the drone stops searching.

When the hiker's position is known, the policy from the earlier examples can be used to plan an optimal route that has an optimal release point for the package, and optimal ingress and egress routes. The point of this example is that the aggregation factors that were relevant for the simpler mission are inadequate for the more complex mission. Craft safety is still a factor, but an optimal route to the hiker cannot be determined before the hiker's position is known.

The new challenge is to have an optimal search process for the hiker. To do a competent search, the agent should be able to check everywhere in the search region to find the hiker. In some cases, the agent may need to double back to reach a region that was not covered on a first pass. Assuming that the drone is much faster than the hiker, the approach can assume that the hiker does not move and should avoid retracing to an area of prior search, unless necessary.

An implication of the task differences is that the aggregation factors needed for the new sub-task are different from the aggregation factors that were needed for the planning ingress, egress, and package release sub-tasks in the earlier examples. It would be counterproductive during ingress to have a penalty for "not looking everywhere" in search for the hiker. The new sub-task example shows that different kinds of sub-tasks with different goals involve different aggregation factors. Simply put, the factors needed to assess the quality of a plan intended to find the hiker should involve penalties for plans that miss the hiker because the AI pilot did not command the drone to look everywhere that the hiker could be.

For another example of a sub-task with different goals and aggregation factors, consider a sub-task for doing an inventory of wildlife such as "counting the bears" or more broadly making a record about where different kinds of large animals were found in a region. The inventory or reconnaissance sub-task shares the "look everywhere" requirement of the locate-the-lost-hiker sub-task, but instead of stopping when it finds what it is looking for, it needs to do a complete search of the region.

The factor tables shown for the service drone application with ingress, package release, and egress subproblems can be extended hierarchically to cover larger problems. For example, an explanation system could provide views of parts of the task. In the service drone application, the parts correspond to different portions of a route where subproblems are concerned with finding a hiker, doing surveillance for forest fires, or carrying out sequential provisioning missions. Drilling down in any particular portion of a mission would reveal the trade-offs relevant to the subproblems in view. Restated, the explanations of behavior would be presented in a manner reflecting a hierarchical decomposition of the task.

The mechanisms of the hybrid AI architecture described earlier for the simple ingress-release-egress problems relied on a structure for coordinating the optimization of solutions. In the application cases discussed, the subproblems were loosely coupled and the oversight function of the cognitive system configured solutions for the parts into optimal and alternative solutions for the mission. This approach can be extended for hierarchically-organized larger problems. Larger problems with loosely or tightly coupled subproblems require system elements to coordinate. In the hybrid AI architecture discussed earlier, an oversight cognitive system combined and optimized alternative or competing solutions. In another coordination approach, partial solutions of subproblems could be coordinated by constraint propagation. For either coordination approach, the explanation system would compute main factors and aggregation factors for gists in the manner described previously.

While the invention has been particularly shown and described as referenced to the embodiments thereof, those skilled in the art will understand that the foregoing and other changes in form and detail may be made therein without departing from the spirit and scope of the invention.

What is claimed is:

1. A system for selection and explanation of solutions, comprising:
    memory to maintain a hierarchy of aggregation factors for evaluating at least a partial solution; and
    a server comprising a central processing unit, memory, an input port to receive the hierarchy of aggregation factors from the memory, and an output port, wherein the central processing-unit is configured to:
    receive a request for a task or activity;
    generate competing solutions for the task for activity via an AI agent, each solution comprising at least a partial solution;
    calculate scores for each of the aggregation factors for each competing solution;
    calculate an evaluation score based on the scores for at least one of the aggregation factors for each competing solution;
    select the competing solution with the best evaluation score;
    generate via the AI agent a gist comprising a narrative comparing the selected solution with the non-selected solutions based on the at least one aggregation factor for the task or activity and based on where the at least one aggregation factor falls in the hierarchy of aggregation factors; and
    provide the gist to a user as a rationale for selection of the solution to the task or activity.

2. A system according to claim 1, wherein the gist identifies one of the aggregation factors as a main factor for selecting the solution with the best evaluation score and one of the aggregation factors as a main penalty that is bypassed during selection of the plan with a worst aggregate score.

3. A system according to claim 2, wherein the central processing unit performs the following:
identify the main factor as the aggregate factor that accounts for 40% or more of a penalty difference between the scores for each of the competing solutions; and
identify the main penalty as the aggregation factor that accepts a small penalty disadvantage in exchange for the penalty identified by the main factor, which is larger.

4. A system according to claim 1, wherein the central processing unit performs the following:
calculate a further evaluation score for a different set of the aggregation factors for each competing solution;
select the competing solution with a best further evaluation score;
generate a gist comprising a narrative comparing the selected solution with the non-selected solutions based on the at least one aggregation factor and the different set of aggregation factors.

5. A system according to claim 1, wherein one or more of the aggregation factors includes sub-factors, which are also assigned scores that are included in the evaluation score.

6. A system according to claim 1, wherein the central processing unit performs the following:
create a visualization of the competing solutions; and
display the visualization for each of the solutions on a world model.

7. A system according to claim 6, wherein the central processing unit performs the following:
provide visualizations for one or more of the aggregation factors on the world model.

8. A system according to claim 7, wherein the visualizations of the competing solutions and the aggregation factors are provided as an overlay on the world model.

9. A system according to claim 6, wherein the central processing unit performs the following:
generate a table for the aggregation factors; and
display the table with the world model.

10. A system according to claim 9, wherein the central processing unit performs the following
select at least one of the aggregation factors in the table; and
display the selected aggregation factor in the world model.

11. A method for selection and explanation of solutions, comprising:
maintaining a hierarchy of aggregation factors for evaluating at least a partial solution;
receiving a request for a task or activity;
generating competing solutions for the task or activity via an AI agent, each solution comprising at least a partial solution;
calculating scores for each of the aggregation factors for each competing solution;
calculating for each competing solution an evaluation score based on the scores for at least one of the aggregation factors;
selecting the competing solution with the best evaluation score;
generating via the AI agent a gist comprising a narrative comparing the selected solution with the non-selected solutions based on the at least one aggregation factor for the task or activity and based on where the at least one aggregation factor falls in the hierarchy of aggregation factors; and
providing the gist to a user as a rationale for selection of the solution.

12. A method according to claim 11, wherein the gist comprises one of the aggregation factors as a main factor for selecting the solution with the best evaluation score and one of the aggregation factors as a main penalty that is bypassed during selection of the plan with a worst aggregate score.

13. A method according to claim 12, further comprising at least one of:
identifying the main factor as the aggregate factor that accounts for 40% or more of a penalty difference between the scores for each of the competing solutions; and
identifying the main penalty as the aggregation factor that accepts a small penalty disadvantage in exchange for the penalty identified by the main factor, which is larger.

14. A method according to claim 11, further comprising:
calculating a further evaluation score for a different set of the aggregation factors for each competing solution;
selecting the competing solution with a best further evaluation score;
generating a gist comprising a narrative comparing the selected solution with the non-selected solutions based on the at least one aggregation factor and the different set of aggregation factors.

15. A method according to claim 11, wherein one or more of the aggregation factors includes sub-factors, which are also assigned scores that are included in the evaluation score.

16. A method according to claim 11, further comprising:
creating a visualization of the competing solutions; and
displaying the visualization for each of the solutions on a world model.

17. A method according to claim 16, further comprising:
providing visualizations for one or more of the aggregation factors on the world model.

18. A method according to claim 17, wherein the visualizations of the competing solutions and the aggregation factors are provided as an overlay on the world model.

19. A method according to claim 16, further comprising:
generating a table for the aggregation factors; and
displaying the table with the world model.

20. A method according to claim 19, further comprising:
selecting at least one of the aggregation factors in the table; and
displaying the selected aggregation factor in the world model.

* * * * *